United States Patent
Shigeta et al.

(10) Patent No.: US 11,645,001 B2
(45) Date of Patent: May 9, 2023

(54) MEMORY SYSTEM AND CONTROLLING METHOD OF MEMORY SYSTEM

(71) Applicant: Kioxia Corporation, Tokyo (JP)

(72) Inventors: Chihoko Shigeta, Kunitachi (JP); Kazuya Kitsunai, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 290 days.

(21) Appl. No.: 17/147,519

(22) Filed: Jan. 13, 2021

(65) Prior Publication Data

US 2022/0066684 A1 Mar. 3, 2022

(30) Foreign Application Priority Data

Aug. 26, 2020 (JP) .............................. JP2020-142585

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,741,436 B2 | 8/2017 | Goss et al. | |
| 9,852,061 B2 | 12/2017 | Lee et al. | |
| 10,002,086 B1 * | 6/2018 | Achtenberg | ........ G06F 13/4068 |
| 2019/0286338 A1 | 9/2019 | Noda | |

FOREIGN PATENT DOCUMENTS

| | | |
|---|---|---|
| JP | 2010-152778 A | 7/2010 |
| JP | 2019-164487 A | 9/2019 |

* cited by examiner

*Primary Examiner* — Jane W Benner
(74) *Attorney, Agent, or Firm* — Oblon, McClelland, Maier & Neustadt, L.L.P.

(57) ABSTRACT

According to one embodiment, a memory system includes a first and second nonvolatile memory each including a plurality of memory cells; and a memory controller configured to perform, in parallel, a first set of write processes sequentially performed on the first nonvolatile memory, and a second set of write processes sequentially performed on the second nonvolatile memory. The memory controller is configured to change a setting of at least one unperformed write process among the first set and second set of write processes based on differences in progress between the first set and second set of write processes, the first set and second set of write processes being performed in parallel.

20 Claims, 22 Drawing Sheets

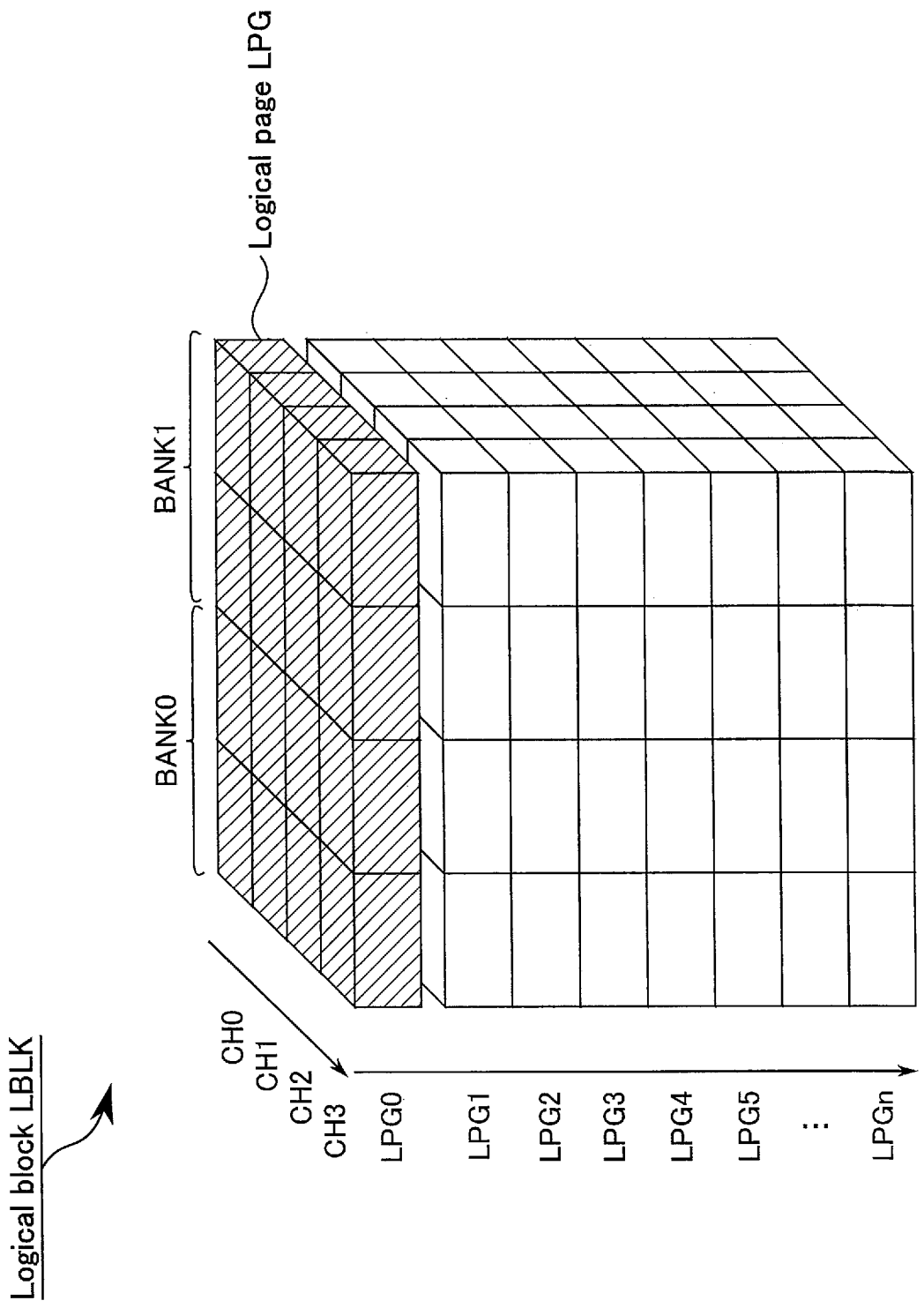
F I G. 4

Progress management table PMT
| | Number of write-completed logical pages |
|---|---|
| CH0 | 0 |
| CH1 | 1 |
| CH2 | 1 |
| CH3 | 1 |
F I G. 6

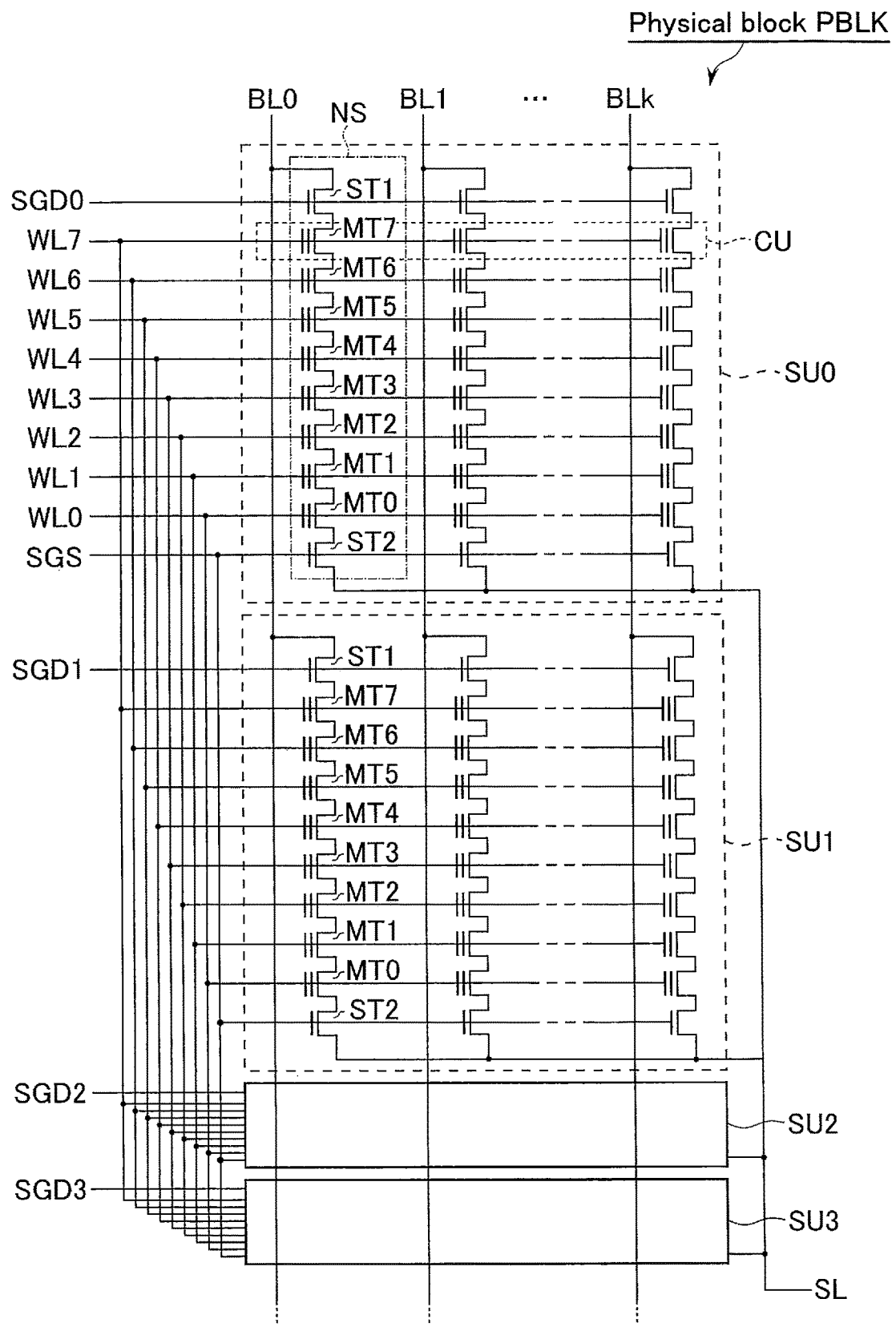
F I G. 8

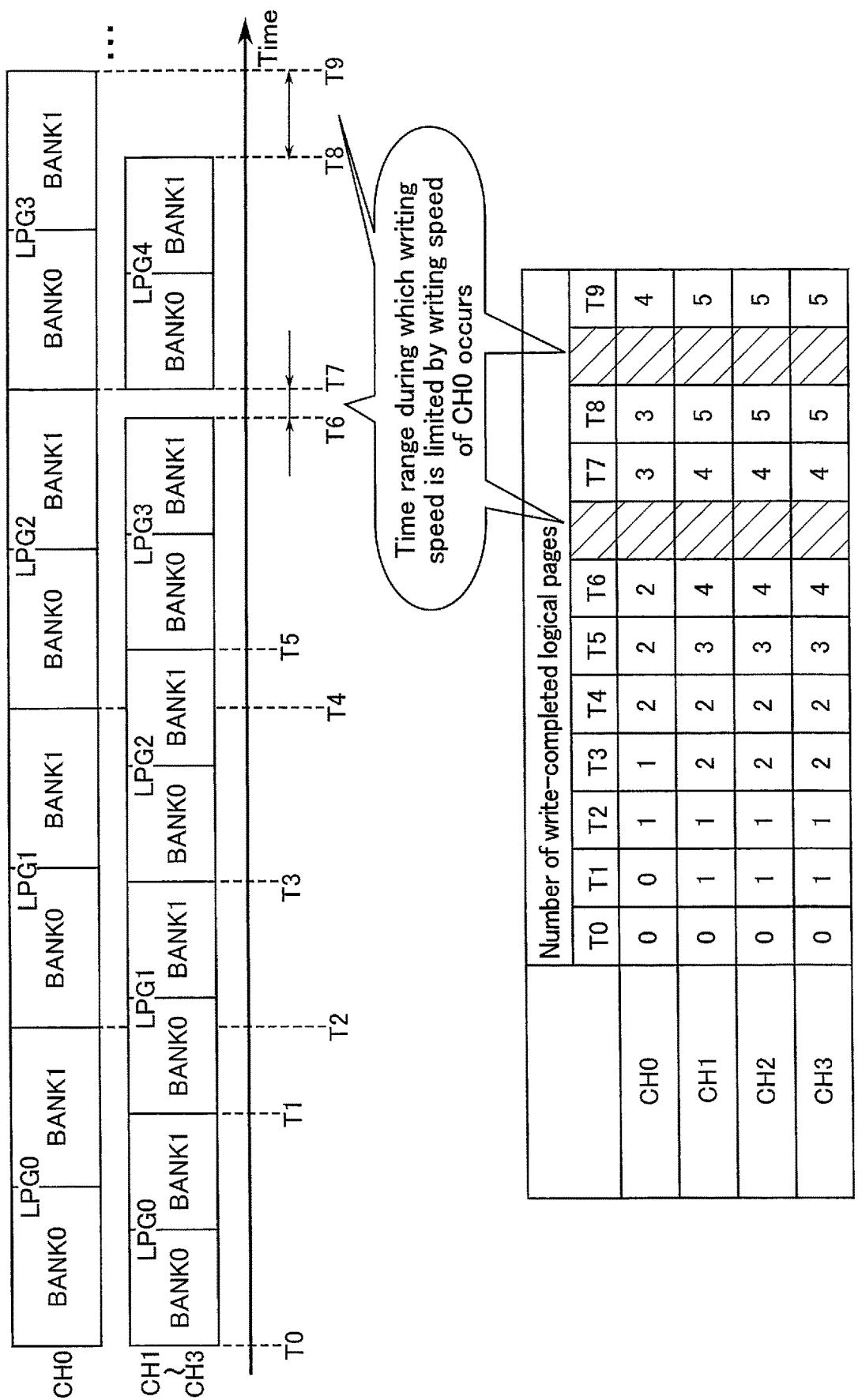
F I G. 13

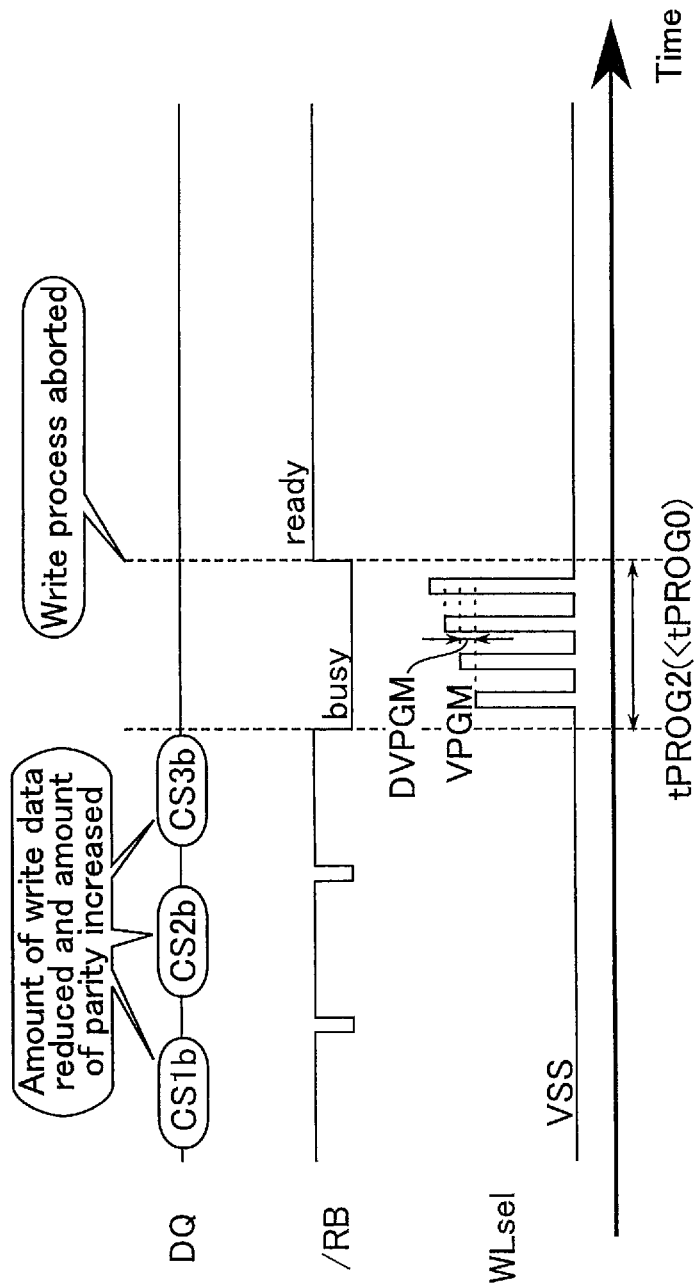
F I G. 17

MEMORY SYSTEM AND CONTROLLING METHOD OF MEMORY SYSTEM

CROSS-REFERENCE TO RELATED APPLICATIONS

This application is based upon and claims the benefit of priority from Japanese Patent Application No. 2020-142585, filed Aug. 26, 2020, the entire contents of which are incorporated herein by reference.

FIELD

Embodiments described herein relate generally to a memory system and a controlling method of the memory system.

BACKGROUND

A memory system that includes a NAND flash memory as a nonvolatile memory capable of storing data in a nonvolatile manner, and a memory controller that controls the NAND flash memory, is known. In the memory controller, a plurality of NAND flash memories are coupled in such a manner as to be operable in parallel. It is thereby possible to improve data writing speed.

BRIEF DESCRIPTION OF THE DRAWINGS

FIG. 4 is a conceptual drawing for explaining a logical block according to the first embodiment.

FIG. 6 is a conceptual diagram for explaining a progress management table in the memory system according to the first embodiment.

FIG. 8 is a circuit diagram for explaining a configuration of a physical block in a memory cell array according to the first embodiment.

FIG. 13 is a schematic diagram for explaining a write process performed by a memory system according to a comparative example.

FIG. 17 is a command sequence and a timing chart for explaining the write process in consideration of progress of each channel in the memory system according to the second embodiment.

DETAILED DESCRIPTION

In general, according to one embodiment, a memory system includes a first nonvolatile memory and a second nonvolatile memory each including a plurality of memory cells; and a memory controller configured to perform, in parallel, a first set of write processes sequentially performed on the first nonvolatile memory, and a second set of write processes sequentially performed on the second nonvolatile memory. The memory controller is configured to change a setting of at least one unperformed write process among the first set of write processes and the second set of write processes based on differences in progress between the first set of write processes and the second set of write processes, the first set of write processes and the second set of write processes being performed in parallel.

Hereinafter, the embodiments will be described with reference to the accompanying drawings. In the descriptions below, constituent elements having similar functions and configurations will be denoted by the same reference symbols. Various modifications can be made to the embodiments.

1. First Embodiment

A first embodiment will be described. In the following, a memory system that includes a NAND flash memory as a nonvolatile memory will be described.

1.1 Configuration

1.1.1 Memory System (Overall Configuration of Memory System)
First, a configuration of a memory system 1 is described with reference to FIG. 1.

Figure 1:
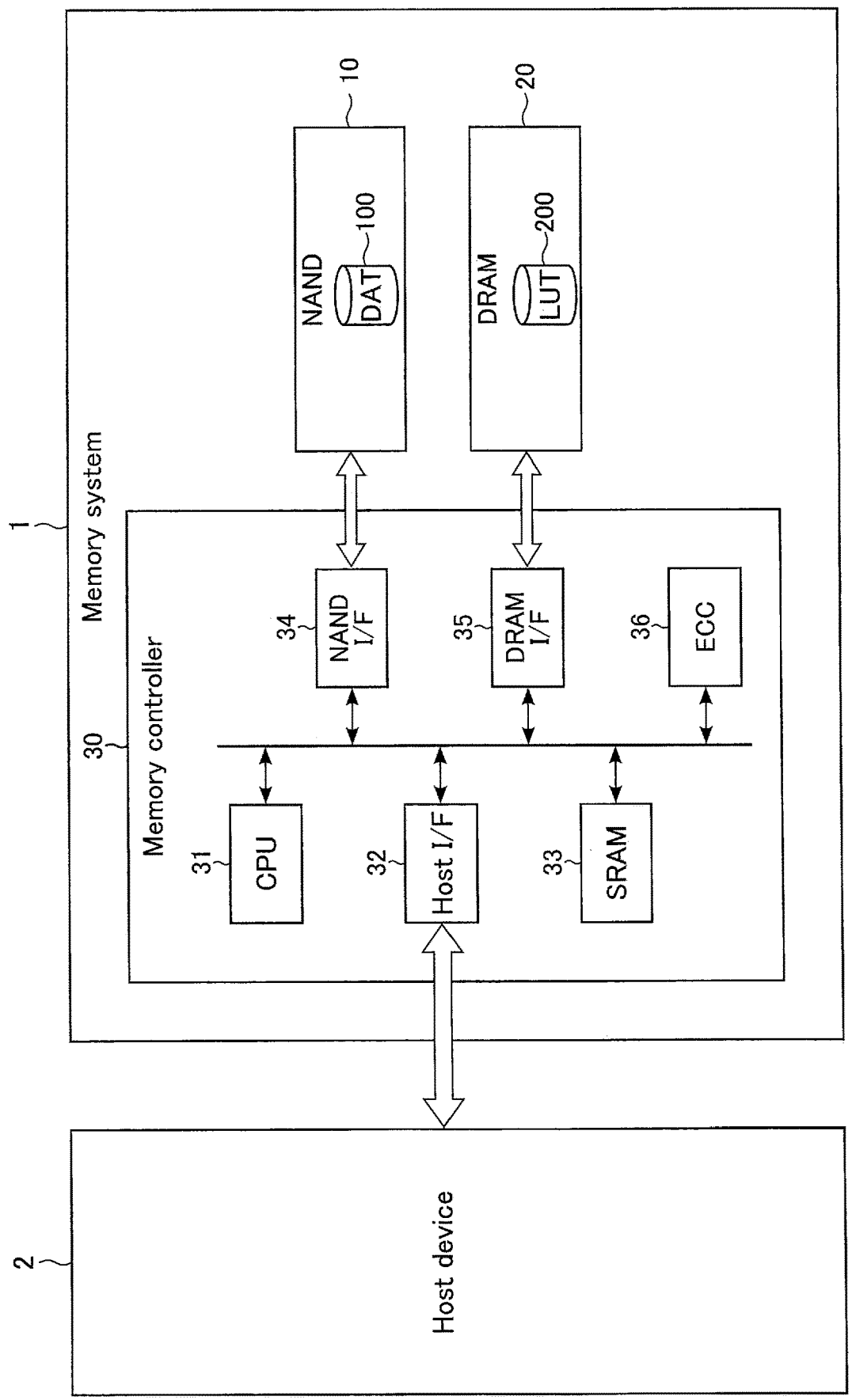
FIG. 1 is a block diagram for explaining a configuration of a memory system according to a first embodiment.

As shown in FIG. 1, the memory system 1 includes a nonvolatile memory 10, a volatile memory 20, and a memory controller 30, and is capable of being coupled to an external host device 2. The nonvolatile memory 10, the volatile memory 20, and the memory controller 30 may, in combination thereof, constitute a single semiconductor memory device, such as an SD™ memory card, a universal flash storage (UFS) device, or a solid state drive (SSD).

The nonvolatile memory 10 (hereinafter, "NAND flash memory 10") is a NAND flash memory that includes a plurality of memory cell transistors, for example, and stores write data instructed by the host device 2 (hereinafter, "write data") as data 100 in a nonvolatile manner.

The volatile memory 20 (hereinafter "DRAM 20") is a DRAM (dynamic random access memory) and stores firmware for managing the NAND flash memory 10 and various sets of management information, such as a lookup table 200. The lookup table 200 is information in which a logical address logically associated with write data by the host device 2 is associated with a physical address associated with a physical storage area in the NAND flash memory 10.

The memory controller 30 writes write data into the NAND flash memory 10 in response to an instruction from the host device 2 and updates the lookup table 200 in the DRAM 20 in order to reflect a status of the write data that is stored in the memory system 1 in a volatile manner.

The memory controller 30 includes a processor (CPU) 31, a host interface circuit 32, a buffer memory 33, a NAND interface circuit 34, a DRAM interface circuit 35, and an ECC circuit 36.

The processor 31 controls an operation of the memory controller 30 through loading a program stored in a ROM (read-only memory) or in the NAND flash memory 10. For example, the processor 31 performs various kinds of processing such as wear leveling in order to manage a memory space in the NAND flash memory 10. The processor 31, in response to a write command (host write command) received from the host device 2, issues a write command (CNT write command) to write data into the NAND flash memory 10, and causes a write process to write data into the NAND flash memory 10 to be performed. In the following descriptions, for the sake of explanation, let us assume that a single write process is performed in response to a single CNT write command.

The host interface circuit 32 is capable of being coupled to the host device 2 via a host bus, and governs communications with the host device 2. The host interface circuit 32 transfers, for example, instructions and data received from the host device 2 to the processor 31 and the buffer memory 33, respectively. The host interface circuit 32 also transfers data in the buffer memory 33 to the host device 2 in response to an instruction from the processor 31.

The buffer memory 33 is an SRAM (static random access memory) for example and temporarily stores read data obtained by the memory controller 30 from the NAND flash memory 10, and write data received from the host device 2.

The NAND interface circuit 34 is coupled to the NAND flash memory 10 via a NAND bus, and governs communications with the NAND flash memory 10.

The ECC circuit 36 performs processing related to error checking and correction (ECC) of data. Specifically, the ECC circuit 36 generates an error correction code (parity) when the write process is performed, and adds the code to the write data. The ECC circuit 36 decodes data read from the NAND flash memory 10 when the read process is performed, and detects a presence/absence of error bits. If an error bit is detected, the ECC circuit 36 specifies the error bit location and corrects the error. The longer the bit length of the error-correcting code added to the write data is, the greater the increase in an upper limit value of the number of correctable error bits (upper limit number of error bits).

Figure 2:
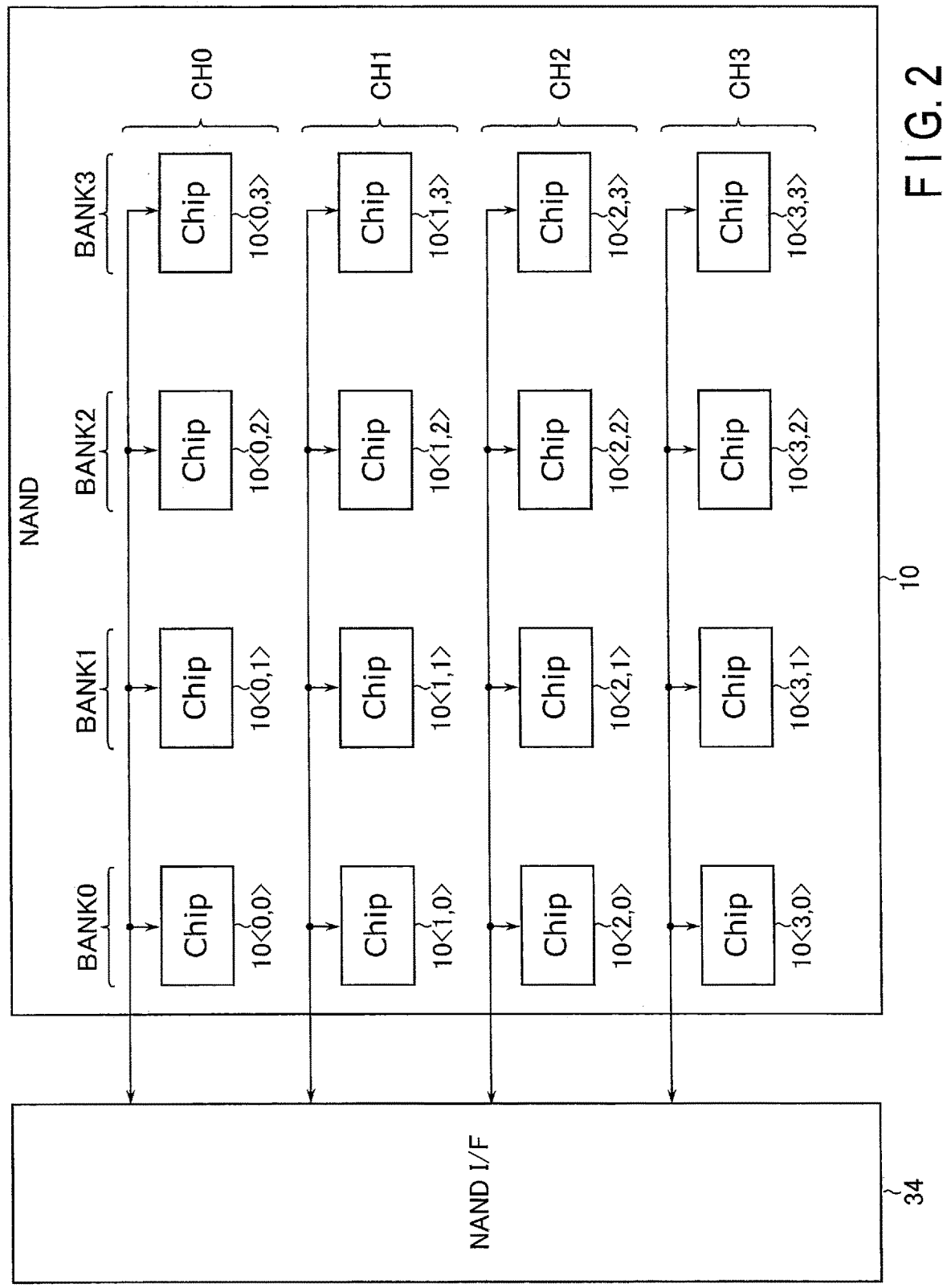
FIG. 2 is a block diagram for explaining a connection relationship between a NAND flash memory and a memory controller according to the first embodiment.

FIG. 2 is a block diagram showing a relationship of a connection between the NAND flash memory and the memory controller in the first embodiment. As shown in FIG. 2, the NAND flash memory 10 includes, for example, a plurality of NAND chips 10<> (10<0, 0>, 10<0, 1>, 10<0, 2>, 10<0, 3>, 10<1, 0>, 10<1, 1>, 10<1, 2>, 10<1, 3>, 10<2, 0>, 10<2, 1>, 10<2, 2>, 10<2, 3>, 10<3, 0>, 10<3, 1>, 10<3, 2>, and 10<3, 3>), each independently functioning as a nonvolatile memory. Each of the plurality of NAND chips 10<> is coupled to the NAND interface circuit 34. Specifically, sets of NAND chips located on the same row in the example shown in FIG. 2, 10<0, 0> through 10<0, 3>, 10<1, 0> through 10<1, 3>, 10<2, 0> through 10<2, 3>, 10<3, 0> through 10<3, 3>, are respectively coupled to the NAND interface circuit 34 via a common NAND bus.

In the following, paths coupling the sets of NAND chips, 10<0, 0> through 10<0, 3>, 10<1, 0> through 10<1, 3>, 10<2, 0> through 10<2, 3>, 10<3, 0> through 10<3, 3>, to the NAND interface circuit 34 may be referred to as channels CH0, CH1, CH2, and CH3, respectively.

Sets of NAND chips located on the same column, 10<0, 0> through 10<3, 0>, 10<0, 1> through 10<3, 1>, 10<0, 2> through 10<3, 2>, 10<0, 3> through 10<3, 3>, may be referred to as banks BANK0, BANK1, BANK2, and BANKS, respectively. In other words, the number of NAND chips 10<> in a single bank BANK corresponds to the number of channels CH (four in the example of FIG. 2).

FIG. 2 shows an example where the number of channels CH is four, and the number of banks BANK is four; however, the embodiment is not limited to this example, and the number of channels CH and that of the bank BANK can be set as appropriate.

For the sake of explanation, a minimum unit of function as a nonvolatile memory is explained as a NAND chip 10<>; however, the NAND chip 10<> is not necessarily formed as a single chip and may be formed across multiple chips. The plurality of NAND chips 10<> may be formed as a single chip.

(Logical Block)

Figure 3:
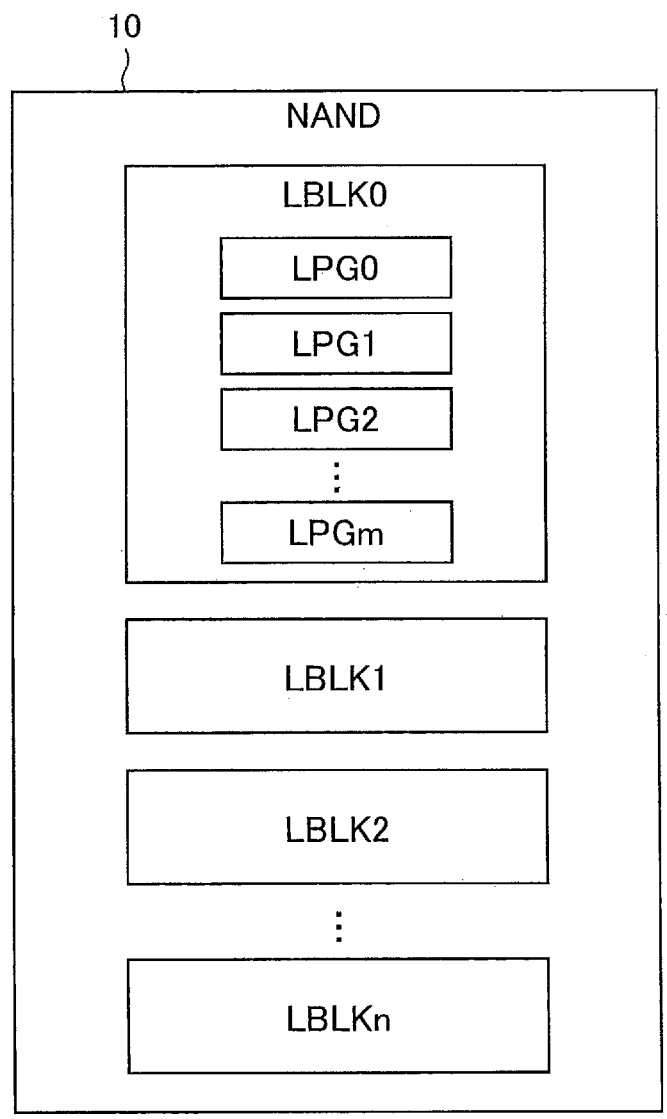
FIG. 3 is a block diagram for explaining an example of a memory space allocated to the NAND flash memory according to the first embodiment.

FIG. 3 is a block diagram showing an example of a memory space allocated to the NAND flash memory according to the first embodiment.

As shown in FIG. 3, the memory space of the NAND flash memory 10 is constituted by a plurality of logical blocks LBLK (LBLK0, LBLK1, LBLK2, . . . , LBLKn) (n is an integer equal to or greater than 2). Each of the plurality of logical blocks LBLK is constituted by a plurality of logical pages LPG (LPG0, LPG1, LPG2, . . . , LPGm) (m is an integer equal to greater than 2). The memory controller 30 is able to specify write data stored in the NAND flash memory 10 through associating the write data with a logical block LBLK and a logical page LPG. Although FIG. 3 shows an example where the minimum number of each of the logical blocks LBLK and the logical pages LPG0 is three, the embodiment is not limited to this example, and the minimum number of each of the logical blocks LBLK may be set as appropriate.

FIG. 4 is a conceptual diagram schematically showing a configuration of one of the logical blocks LBLK shown in FIG. 3. As shown in FIG. 4, a single logical block LBLK is allocated to the NAND chips 10<> belonging to two banks BANK among all the NAND chips 10<>, for example. In the examples of FIGS. 4 and 2, the logical block LBLK is allocated over the NAND chips 10<0, 0>, 10<1, 0>, 10<2, 0>, and 10<3, 0> belonging to the bank BANK0, and the NAND chips 10<0, 1>, 10<1, 1>, 10<2, 1>, and 10<3, 1> belonging to the bank BANK1. To the memory space spanning the NAND chips 10<0, 0>, 10<1, 0>, 10<2, 0>, and 10<3, 0> belonging to the bank BANK0 and the NAND chips 10<0, 1>, 10<1, 1>, 10<2, 1>, and 10<3, 1> belonging to the bank BANK1, multiple logical blocks LBLK shown in FIG. 4 are allocated. Similarly, to the memory space spanning the NAND chips 10<0, 2>, 10<1, 2>, 10<2, 2>, and 10<3, 2> belonging to the bank BANK2 and the NAND chips 10<0, 3>, 10<1, 3>, 10<2, 3>, and 10<3, 3> belonging to the bank BANK3, multiple logical blocks LBLK having the same size as the logical block LBLK shown in FIG. 4 are allocated.

(Functional Configuration)

Figure 5:
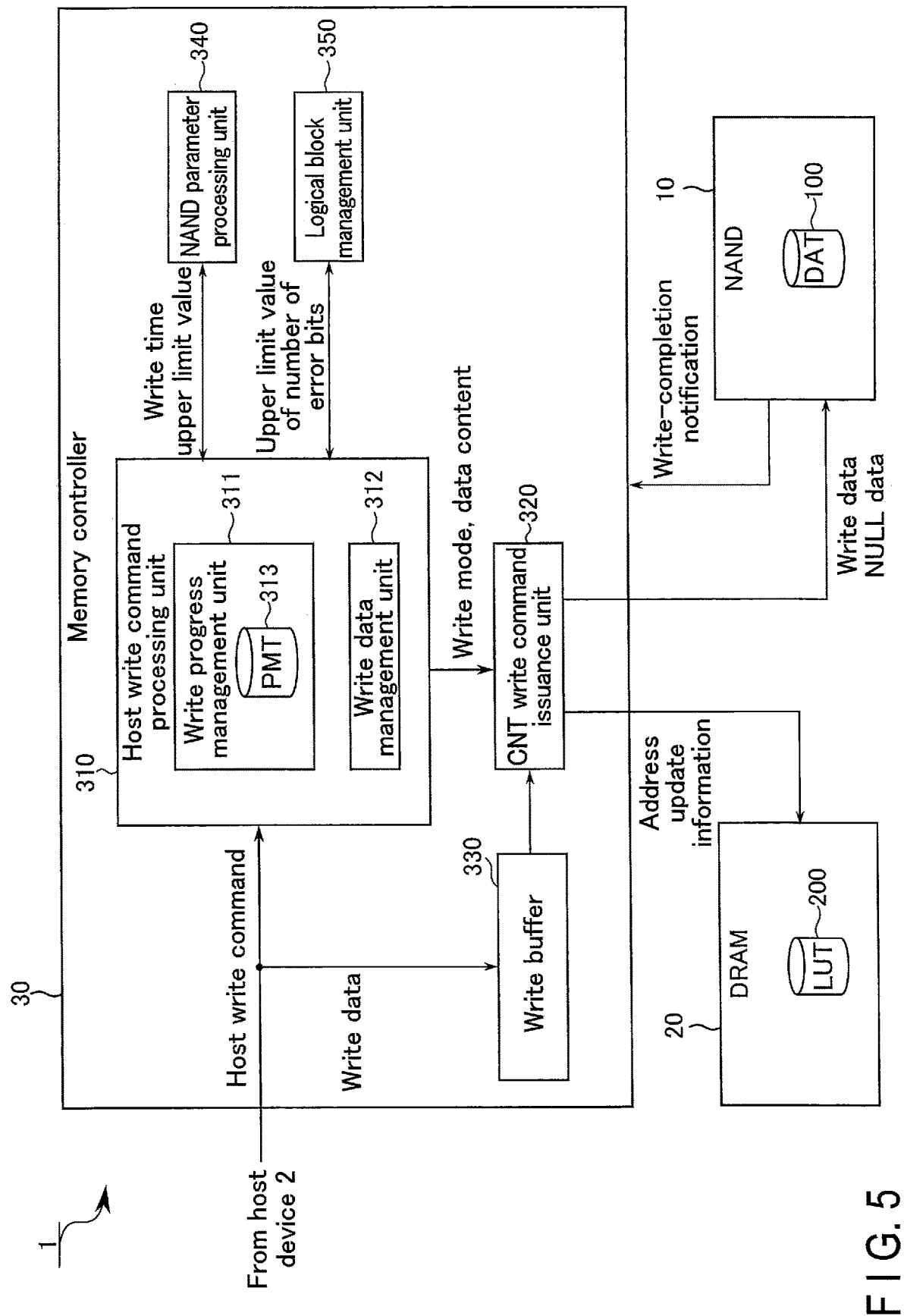
FIG. 5 is a block diagram for explaining a functional configuration relating to a write process of the memory controller according to the first embodiment.

FIG. 5 is a block diagram showing a functional configuration relating to a write process by a memory controller according to the first embodiment. As shown in FIG. 5, in the memory controller 30, when a write process is performed: the processor 31 functions as a host write command processing unit 310, a CNT write command issuance unit 320, a NAND parameter processing unit 340, and a logical block management unit 350; and the buffer memory 33 functions as a write buffer 330.

The host write command processing unit 310 controls a write process in the memory system 1 upon receipt of a host write command from the host device 2. The host write command processing unit 310 includes a write progress management unit 311 and a write data management unit 312.

The write progress management unit 311 updates a progress management table 313 upon receipt of a write-completion notification from the NAND flash memory 10; thus, the write progress management unit 311 manages the progress in the write process for each channel CH.

FIG. 6 is a conceptual drawing showing a configuration of the progress management table according to the first embodiment.

As shown in FIG. 6, the number of write-completed logical pages for each channel CH is stored in the progress management table 313. The number of write-completed logical pages of a certain channel CH shows progress in the writing of a part corresponding to the channel CH, among the write data spanning multiple logical pages LPG. In a case where the write data spanning multiple logical pages LPG is written by multiple processes, the number of write-completed logical pages should become effective when multiple write processes are commenced, and reset when all write processes are completed.

Every time a write process is completed for a certain logical page LPG, the write progress management unit 311 updates the progress management table 313 with the number of write-completed logical pages for a channel CH to which the completed write process was performed.

Returning to FIG. 5, the functional configuration of the memory controller 30 related to the write process is described.

The write data management unit 312 refers to the progress management table 313 designed to help ascertain the differences in progress of the write process between channels CH. The write data management unit 312 controls various parameters related to the write process so that the differences in progress fall under a threshold.

Specifically, for example, the write data management unit 312 determines, for each write process, whether the data (data content) to be written in the NAND flash memory 10 should be either write data or NULL data. The write data management unit 312 sends the determined data content to the CNT write command issuance unit 320. The NULL data is irrelevant to the write data from the host device 2 and may correspond to data stored in a memory cell transistor in which a threshold voltage is in an erase state.

The write data management unit 312 determines, for each write process, a write mode that designates the number of bits for the data to be written in a memory cell transistor in a write process. For example, the write data management unit 312 can determine an SLC (single-level cell) mode, an MLC (multi-level cell) mode, and a TLC (triple-level cell) mode. The SLC mode, MLC mode, and TLC mode are a write mode for storing 1-bit data, 2-bit data, and 3-bit data, respectively, for a single memory cell transistor. The write data management unit 312 sends the determined write mode to the CNT write command issuance unit 320.

The write data management unit 312 determines, for each write process, an upper limit value of time tPROG, during which the write data is written in the NAND flash memory 10 ("write time upper limit value"), and sends the determined write time upper limit value to the NAND parameter processing unit 340. The write data management unit 312 determines upper limit value of the number of error bits for each write process and sends the determined upper limit value of the number of error bits to the logical block management unit 350.

After receiving a write instruction including data content and a write mode from the host write command processing unit 310, the CNT write command issuance unit 320 issues a CNT write command to instruct for data to be written into the NAND flash memory 10 based on the write instruction. Upon receipt of the CNT write command, the NAND flash memory 10 stores the designated data content using the designated write mode. After the write process is completed, the NAND flash memory 10 sends a write-completion notification to the memory controller 30.

After the write process in the NAND flash memory 10 is completed, the CNT write command issuance unit 320 issues a CNT write command that instructs writing of address update information, including a correspondence between the logical address and the physical address that have been updated by the write process to the DRAM 20, and sends the CNT write command to the DRAM 20. It is thereby possible for the DRAM 20 to update the lookup table 200 with a latest state in accordance with the address update information.

The write buffer 330 has a memory size of the particular number of logical pages (for example, two logical pages), temporarily stores the write data from the host device 2, and sends the write data to the CNT write command issuance unit 320 when a write process is performed. When the write process corresponding to one logical page is completed, the write buffer 330 deletes or invalidates the write data of one logical page and then stores new write data from the host device 2. The write data stored in the write buffer 330 is managed as appropriate by the host write command processing unit 310 in accordance with the progress in the write process.

The NAND parameter processing unit 340 manages various parameters relating to the NAND flash memory 10 (for example, a write time upper limit value) for each NAND chip 10< >. If notification of a change of the write time upper limit value is received from the write data management unit 312, the NAND parameter processing unit 340 instructs the NAND chip 10< > to change the write time upper limit value in advance of a write process. For example, when the NAND parameter processing unit 340 notifies the host write command processing unit 310 of the change of the write time upper limit value, the host write command processing unit 310 instructs a target NAND chip 10< > to change the write time upper limit value in advance of a write process, via the CNT write command issuance unit 320.

The logical block management unit 350 manages the various parameters relating to the logical blocks LELK in the write process (for example, the upper limit value of the number of error bits) for each channel CH. When the change of the upper limit value of the number of error bits is notified from the write data management unit 312, the logical block management unit 350 instructs, in advance of the write process, the ECC circuit 36 to change the upper limit value of the number of error bits for a corresponding channel CH.

With the above-described configuration, a write process in which various settings are changed is performed, in accordance with differences in progress in the write process between the channels CH.

1.1.2 NAND Chip

Next, a configuration of a NAND chip of the memory system according to the first embodiment will be described.

Figure 7:
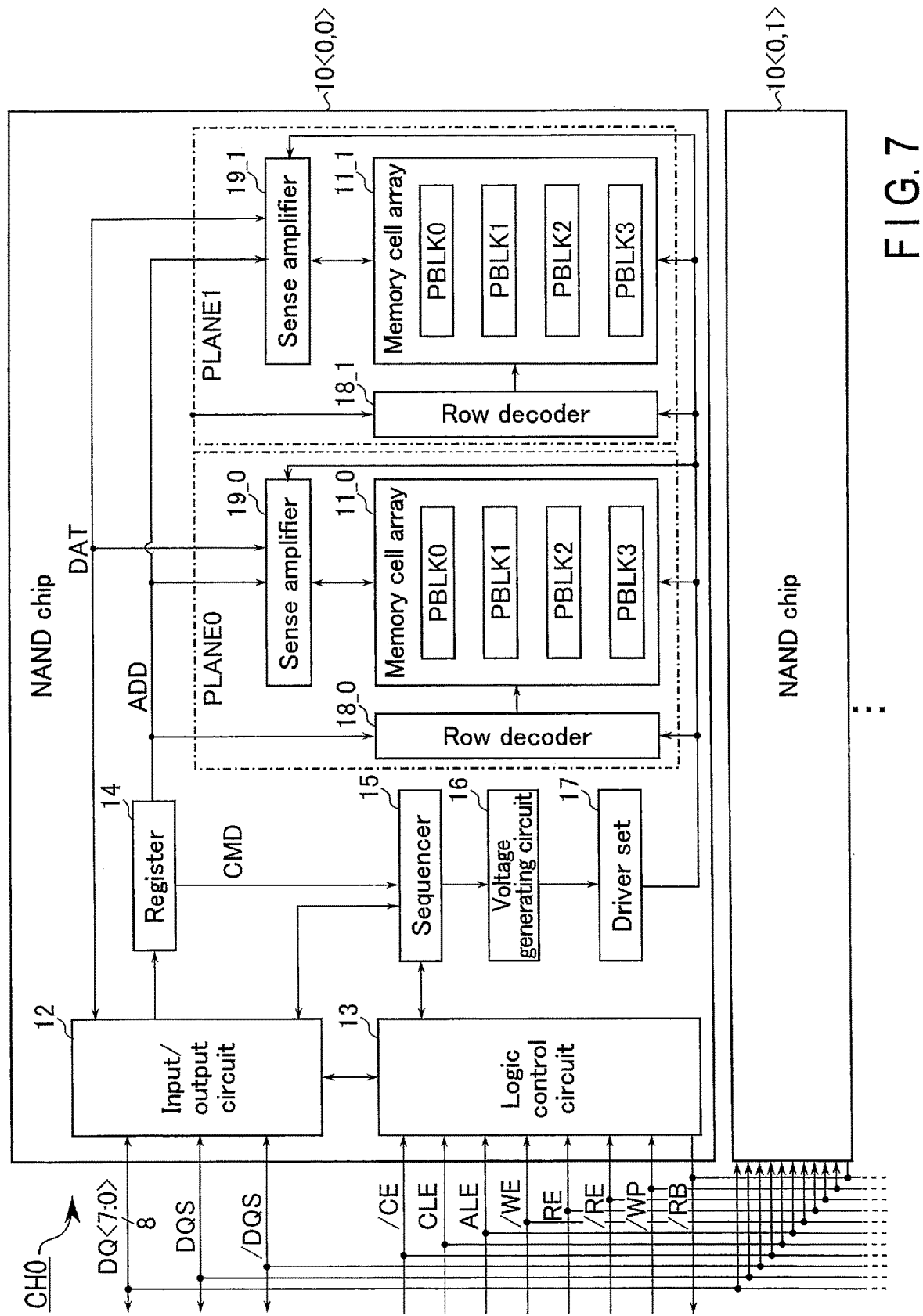
FIG. 7 is a block diagram for explaining a configuration of a NAND chip according to the first embodiment.

FIG. 7 is a block diagram for explaining a configuration of a NAND chip according to the first embodiment. In FIG. 7, a connection relationship between the memory controller 30 and the NAND chips 10< > via a channel CH0 and a configuration of the NAND chip 10<0, 0> as a specific example of the NAND chips 10< > coupled to the CH0 are shown as an example. Since the other NAND chips 10< > have the same configuration as the NAND chip 10<0, 0>, descriptions of the configuration of the other NAND chips 10< > are omitted. Similarly, since the connection relationship between the channels CH1 though CH3 and the memory controller 30 is the same as that between the channel CH0 and the memory controller 30, descriptions are omitted.

As shown in FIG. 7, the NAND chip 10<0, 0> includes a memory cell array 11 (11_0 and 11_1), an input/output circuit 12, a logic control circuit 13, a register 14, and a sequencer 15, a voltage generating circuit 16, a driver set 17, a row decoder 18 (18_0 and 18_1), and a sense amplifier 19 (19_0 and 19_1). The memory cell array 11_0, the row decoder 18_0, and the sense amplifier 19_0 constitute a plane PLANE0. The memory cell array 11_1, the row decoder 18_1, and the sense amplifier 19_1 constitute a plane PLANE1.

The planes PLANE0 and PLANE1 have a similar configuration and are coupled in parallel to other constituent structures of the NAND chip 10<0, 0>. It is thereby possible to operate the planes PLANE0 and PLANE1 in parallel within the NAND chip 10<0, 0>. The following descriptions of the memory cell array 11, the row decoder 18, and the sense amplifier 19 are equally applied to each of the planes PLANE0 and PLANE1.

The memory cell array 11 includes a plurality of physical blocks PBLK, which are an assembly of a plurality of nonvolatile memory cell transistors respectively associated with bit lines and word lines. The physical block PBLK may be a unit of data erasure for example, and an integral multiple of the memory size of a physical block PBLK corresponds to the memory size of a logical block LBLK. FIG. 7 shows that each of the planes PLANE0 and the PLANE1 includes four blocks PBLK0 through PBLK3 in as an example.

The input/output circuit 12 and the logic control circuit 13 send and receive signals compliant to the NAND interface to and from the memory controller 30.

Specifically, the input/output circuit 12 sends and receives 8-bit input/output signal DQ<7:0> and signals DQS and/DQS to and from the memory controller 30. The input/output signal DQ<7:0> includes data DAT, an address ADD, and a command CMD, etc. The signal DQS is a strobe signal. The signal/DQS is an inversion signal of the signal DQS. The input/output circuit 12 transfers the address ADD and the command CMD in the signal DQ<7:0> to the register 14. The input/output circuit 12 sends and receives write data and read data DAT to and from the sense amplifier 19.

The logic control circuit 13 receives the signals/CE, CLE, ALE, /WE, RE, /RE, and /WP from the memory controller 30. The logic control circuit 13 transfers the signal/RB to the memory controller 30 to externally notify the status of the NAND chip 10<0, 0>.

The signal/CE is for enabling the NAND chip 10<0, 0> and is asserted at an "L" (low) level. The NAND chip 10<0, 0> in an enabled state is configured to, for example, recognize that the other signals CLE, ALE, /WE, RE, /RE, /WP, DQ<7, 0>, DQS, and/DQS are directed to itself, to incorporate these signals into itself, and to send the signal/RB according to its own state to the memory controller 30.

The signals CLE and ALE notify the NAND chip 10<0, 0> that the input signal DQ<7, 0> to the NAND chip 10<0, 0> is a command and an address. Specifically, if the signals CLE and ALE are at an "H" (high) level and an "L" level respectively, the signals notify the NAND chip 10<0, 0> that the input signal DQ<7, 0> is a command CMD, and if the signals CLE and ALE are at an "L" level and an "H" level respectively, the signals notify the NAND chip 10<0, 0> that the input signal DQ<7, 0> is an address ADD. If both are in an "L" level, the signals CLE and ALE notify the NAND chip 10<0, 0> that the input signal DQ<7, 0> is data DAT.

The signal/WE is asserted at an "L" level, and causes the NAND chip 10<0, 0> to incorporate the input signal DQ<7, 0> into itself. The signal/RE is asserted at an "L" level and to output the output signal DQ<7:0> from the NAND chip 10<0, 0>. The signal RE is an inversion signal of the signal/RE. The signal/WP is asserted at an "L" level, and inhibits writing to the NAND chip 10<0, 0>.

The signal/RB indicates whether the NAND chip 10<0, 0> is in a ready state (a state where an instruction from the memory controller 30 can be received) or in a busy state (a state where an instruction from the memory controller 30 cannot be received), and the "L" level indicates a busy state.

The NAND interface circuit 34 of the memory controller 30 communicates each of the above-described signals, namely DQ<7, 0>, DQS, /DQS, /CE, CLE, ALE, /WE, RE, /RE, /WP, and /RB, using a common signal line among the NAND chips 10<0, 0> through 10<0, 3> belonging to a channel CH0.

The register 14 stores the command CMD and the address ADD received from the memory controller 30 via the input/output circuit 12.

The sequencer 15 controls the operation of the entire NAND chip 10<0, 0> based on the command CMD stored in the register 14.

The voltage generating circuit 16 generates voltages used in a read process, a write process, and an erase process, etc. The driver set 17 transfers the voltages generated by the voltage generating circuit 16 to the memory cell array 11, the row decoder 18, and the sense amplifier 19.

The row decoder 18 selects one of the physical blocks PBLK0 through PBLK3 based on an address in the register 14, and further selects a word line in the selected physical block PBLK.

In a data write process, the sense amplifier 19 transfers write data DAT received from the memory controller 30 to the memory cell array 11. In a data read process, the sense amplifier 19 senses a threshold voltage of the memory cell transistor in the memory cell array 11 and reads read data DAT based on the sensing result.

FIG. 8 is a circuit diagram showing a configuration of a physical block in the memory cell array according to the first embodiment. FIG. 8 shows one of a plurality of physical blocks PBLK included in the memory cell array 11.

As shown in FIG. 8, the physical block PBLK includes four string units SU (SU0 to SU3), for example. Each string unit SU includes a plurality of NAND strings NS respectively associated with bit lines BL0 to BLk (k is an integer equal to or greater than 1). Each NAND string NS includes, for example, eight memory cell transistors MT0 to MT7 and select transistors ST1 and ST2. Each of the select transistors ST1 and ST2 is used to select a string unit SU at the time of performing various operations. Each memory cell transistor MT includes a control gate and a charge storage layer, and stores electric charge (electrons) corresponding to data in a nonvolatile manner. The memory cell transistor MT is configured to be capable of storing data in different numbers of bits in accordance with a write mode applied to the write process.

In each NAND string NS, the memory cell transistors MT0 to MT7 are coupled in series. The drain of the select transistor ST1 is coupled to an associated bit line BL, and the source of the select transistor ST1 is coupled to one set of ends of the memory cell transistors MT0 through MT7, which are coupled in series. The drain of the select transistor ST2 is coupled to the other set of ends of the memory cell transistors MT0 through MT7, which are coupled in series. The source of the select transistor ST2 is coupled to the source line SL.

In the same physical block PBLK, the control gates of the memory cell transistors MT0 through MT7 are respectively coupled to word lines WL0 through WL7. The gates of select transistors ST1 respectively included in the string units SU0 through SU3 are respectively coupled in common to select gate lines SGD0 through SGD3. The gates of the select transistors ST2 are coupled in common to the select gate line SGS.

In other words, the physical block PBLK is an assembly of the string units SU sharing the word lines WL0 through WL7. A block BLK is a unit of data erasure for example. In other words, data stored in memory cell transistors MT included in the same physical block PBLK is erased in a batch.

A string unit SU is an assembly of the NAND strings NS coupled both to respective bit lines BL and to the same select gate line SGD. In a string unit SU, an assembly of memory cell transistors MT coupled in common to the same word line WL may be also called "cell unit CU". For example, a group of same-level bits stored in the plurality of memory cell transistors MT in the cell unit CU is defined as "one physical page". In other words, if the SLC mode, the MLC mode, and the TLC mode are applied in the write process, one-physical page data, two-physical page data, and three-physical page data are stored in the cell unit CU, respectively. An integral multiple of the memory size of a physical page stored in the cell unit CU corresponds to the memory size of a logical page LPG.

The above-described circuit configuration of the memory cell array 11 is not restrictive. For example, the number of the memory cell transistors MT and the number of the select transistors ST1 and ST2 included in each NAND string NS may be determined as appropriate. The number of string units SU included in each block BLK may also be determined as appropriate.

1.2 Operation

Next, an operation of the memory system according to the first embodiment will be described.

1.2.1 Overview of Write Process

Figure 9:
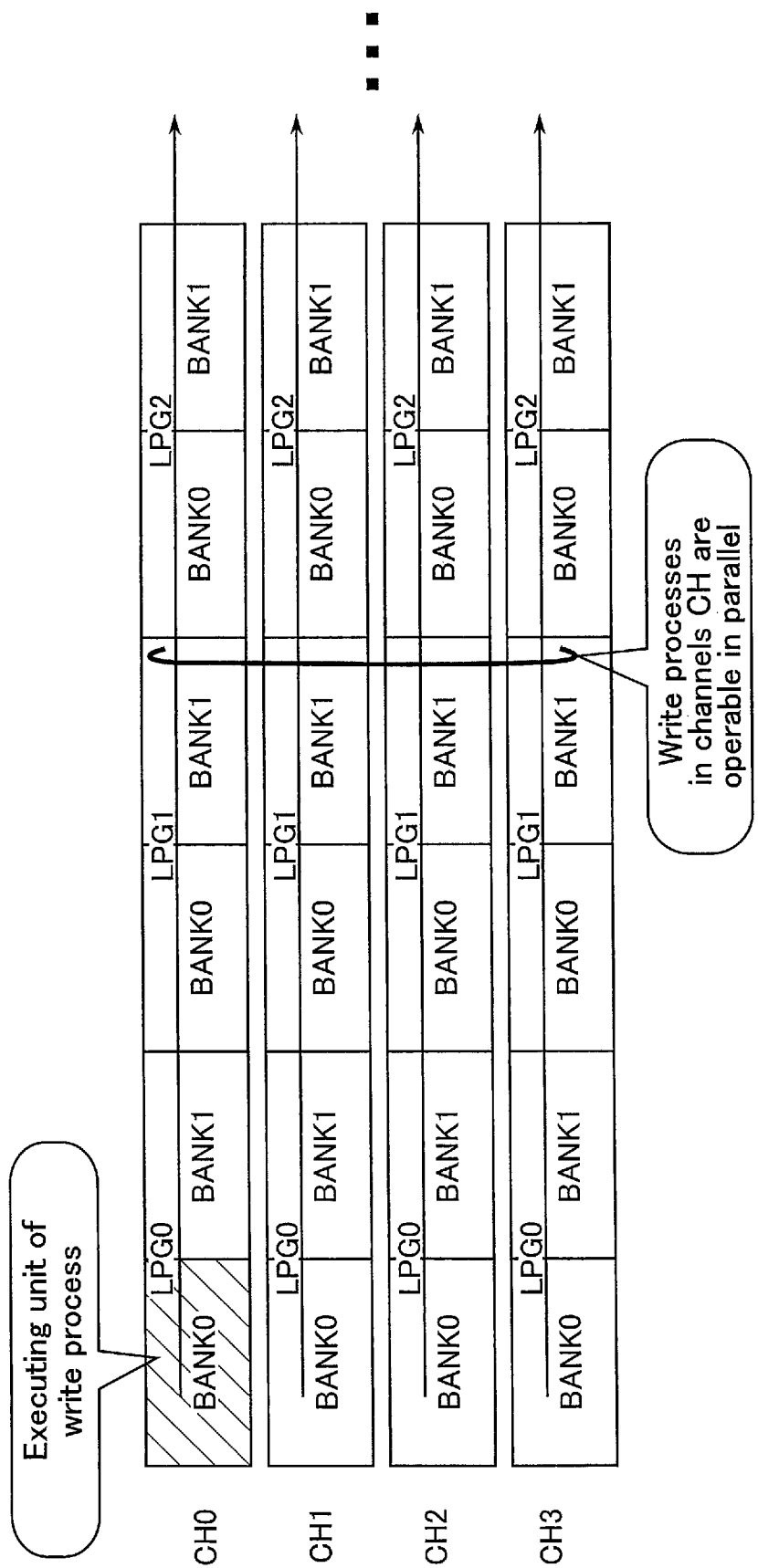
FIG. 9 is a schematic diagram for explaining an overview of a write process in the memory system according to the first embodiment.

FIG. 9 is a schematic diagram showing an overview of the write process in the memory system according to the first embodiment. FIG. 9 shows a case where a write process is performed for multiple logical pages LPG in a certain logical block BLK (in the order of the logical pages LPG0, LPG1, LPG2, . . . ).

As shown in FIG. 9, a single write process is performed, among one logical page LPG, for a part corresponding to a single bank BANK (the shaded part in FIG. 9) in a single channel CH, for example. In other words, the CNT write command issuance unit 320 issues a CNT command for each executing unit of write process to instruct the writing of data into the NAND flash memory 10. The CNT write command is not necessarily a single command set; it may include multiple command sets issued for each cell unit CU described above, or for each psychical page.

The memory system 1 is configured to be capable of performing a write process in parallel to each channel CH. Specifically, the NAND flash memory 10 is capable of performing four write processes in parallel in the channels CH0 through CH3. In other words, in the example FIG. 9, multiple write processes sequentially performed for the bank BANK0 of the logical page LPG0, the bank BANK1 of the logical page LPG0, the bank BANK0 of the logical page LPG1, the bank BANK1 of the logical page LPG1, the bank BANK0 of the logical page LPG2, and the bank BANK1 of the logical page LPG2, in this order, are performed in parallel in the channels CH0 through CH3.

1.2.2 Flowcharts

Next, the write process in the memory system according to the first embodiment will be described with reference to the flowcharts of FIGS. 10 and 11.

Figure 10:
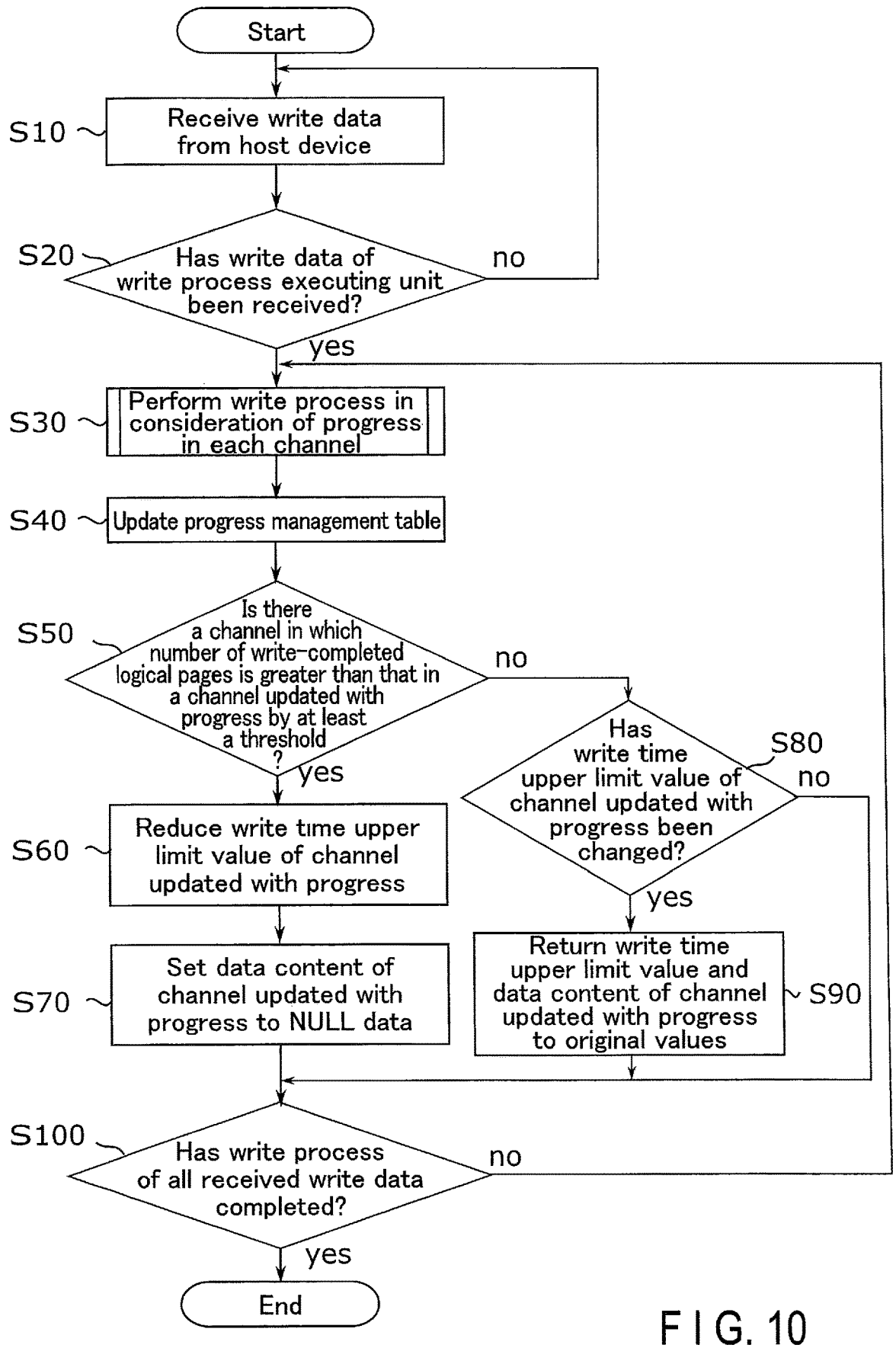
FIG. 10 is a flowchart for explaining the write process performed by the memory system according to the first embodiment.

As shown in FIG. 10, the host write command processing unit 310 receives write data from the host device 2 in S10. The write data management unit 312 causes the write buffer 330 to temporarily store the write data.

In S20, the write data management unit 312 determines whether or not the write data of a write process executing unit shown in FIG. 9 has been received. If it is determined that the write data of a write process executing unit has been received (S20; Yes), the process proceeds to S30. If it is determined that the write data of a write process executing unit has not been received (S20; No), the process returns to S10. In other words, the write data management unit 312 continues receiving the write data from the host device 2 until the write data of a write process executing unit is entirely stored in the write buffer 330.

In S30, the CNT write command issuance unit 320 performs a write process in consideration of the progress of each channel CH, based on an instruction from the host write command processing unit 310. The details of S30 will be described later with reference to FIG. 11. In the write process in S30, the memory controller 30 receives a write-completion notification from the NAND flash memory 10.

In S40, the write progress management unit 311 updates the progress management table 313 based on the write-completion notification.

In S50, the write data management unit 312 refers to the progress management table 313 updated in S40, and determines the existence of otherwise of a channel CH in which the number of write-completed logical pages is greater, by at least a threshold, than that in the channels CH updated with progress.

If there indeed exists a channel CH in which the number of write-completed logical pages is greater, by at least the threshold, than that in the channels CH updated with progress (S50; Yes), the process proceeds to S60. In S60, the write data management unit 312 sends an instruction to reduce the write time upper limit value of the channel CH updated with progress to the NAND parameter processing unit 340. The NAND parameter processing unit 340 reduces the write time upper limit value of the channel CH updated with progress in accordance with the instruction from the write data management unit 312. In S70, the write data management unit 312 sends, to the CNT write command issuance unit 320, an instruction to write NULL data into the channel CH updated with progress. When S70 is completed, the process proceeds to S100.

On the other hand, if there is no channel CH in which the number of write-completed logical pages is greater by at least the threshold than that in the channels CH updated with progress (S50; No), the process proceeds to S80. In S80, the write data management unit 312 determines whether or not the write time upper limit value of the channel CH updated with progress has been changed (namely, whether or not the write time upper limit value has been reduced in S60). If the write time upper limit value has been changed (S80; Yes), the process proceeds to S90. In S90, the NAND parameter processing unit 340 returns the write time upper limit value and the data content of the channel CH updated with progress to the originally set values in accordance with the instruction from the write data management unit 312. When the process in S90 is finished, the process proceeds to S100. If the write time upper limit value of the channel CH updated with progress has not been changed (namely, if the write time upper limit value remains at an originally set value) (S80; No), the process omits S90 and proceeds to S100.

In S100, the write data management unit 312 determines whether or not the write process for all the received write data has completed. If the write process for all the received write data has completed (S100; Yes), the write process is finished. If the write process for all the received write data has not completed (S100; No), the process returns to S30. Thus, the process from S30 to S100 is repeated until the write process for all the received write data is completed.

The write process is thus finished.

In the example of FIG. 10, S80 involves a determination of whether or not the write time upper limit value has been changed, but the embodiment is not limited to this example. For example, in S80, the write data management unit 312 may determine whether or not the data content of a channel updated with progress has been changed to NULL data.

Next, the details of S30 shown in FIG. 10 is described with reference to FIG. 11.

Figure 11:
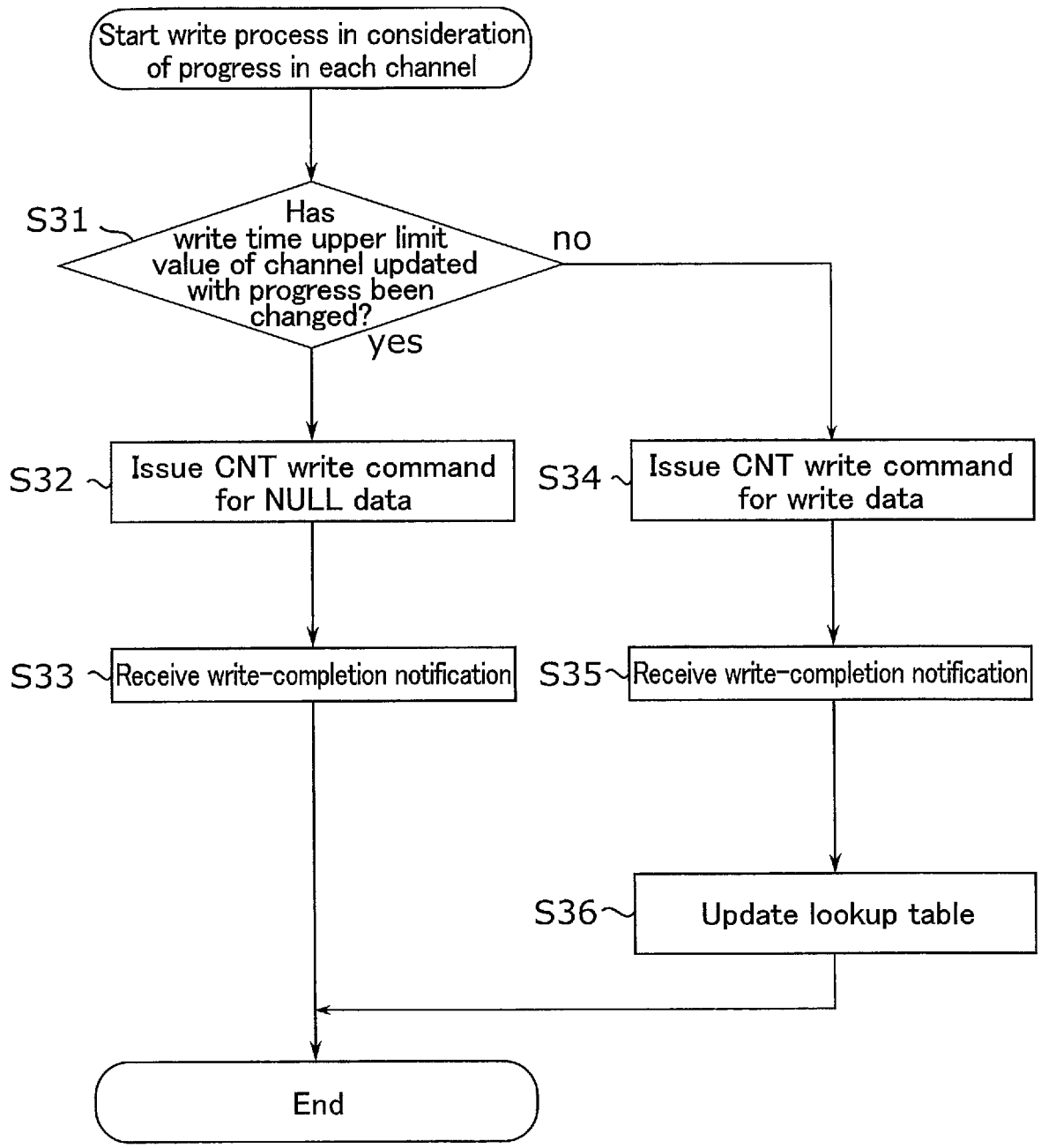
FIG. 11 is a flowchart for explaining a write process in consideration of progress of each channel in the memory system according to the first embodiment.

As shown in FIG. 11, in S31, the CNT write command issuance unit 320 determines whether or not the write time upper limit value of a channel (write-target channel) CH for which the CNT write command was issued has been changed by the NAND parameter processing unit 340. If the write time upper limit value of the write-targeted channel CH has been changed (reduced from the originally set value) (S31; Yes), the process proceeds to S32.

In S32, the CNT write command issuance unit 320 issues a CNT write command instructing to write NULL data and sends the command to the NAND flash memory 10. Thus, the NAND flash memory 10 performs a write process in which NULL data is written in a logical page LPG of the write-targeted channel. After the write process is completed, the NAND flash memory 10 sends a write-completion notification to the memory controller 30, and in S33, the memory controller 30 receives the write-completion notification.

If NULL data is written, since the write data from the host device 2 is not written in the memory cell array 11, the lookup table 200 is not updated.

On the other hand, if the write time upper limit value of the write-target channel CH has not been changed (namely, if the value has not been reduced from an originally set value) (S31; No), the process proceeds to S34.

In S34, the CNT write command issuance unit 320 issues a CNT write command that instructs data write and sends the command to the NAND flash memory 10. Thus, the NAND flash memory 10 performs a write process in which write data is written in a logical page LPG of the write-targeted channel.

After the write process is completed, the NAND flash memory 10 sends a write-completion notification to the memory controller 30, and in S35, the memory controller 30 receives the write-completion notification.

In S36, the CNT write command issuance unit 320 issues a CNT write command that instructs the writing of address update information of write data written in the NAND flash memory 10 in S34, and sends the command to the DRAM 20. Thus, the DRAM 20 is updated with the lookup table 200 into which the latest state is incorporated.

The write process in consideration of the progress of each channel CH is thus completed.

1.2.3 Command Sequence and Timing Chart

Figure 12:
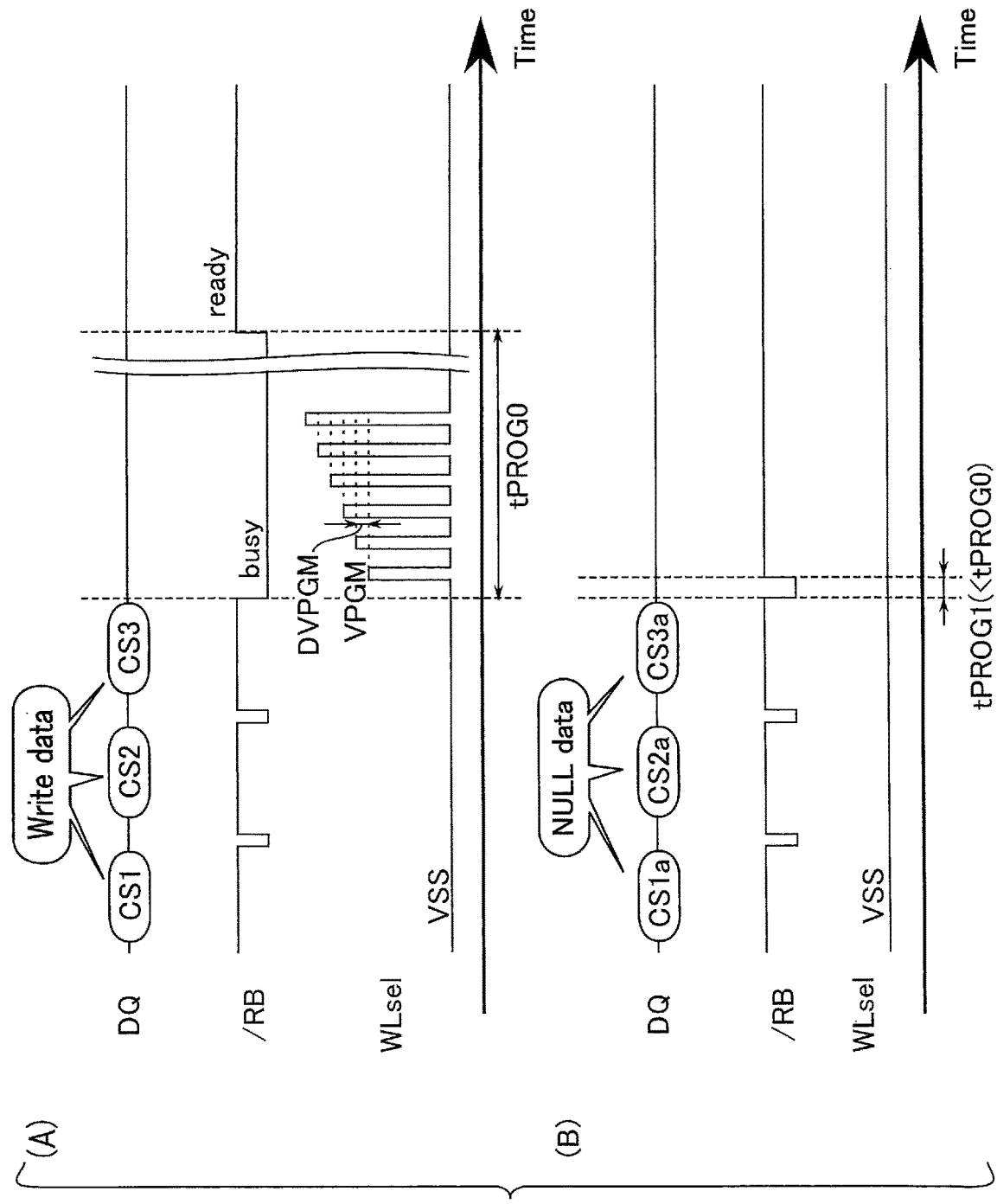
FIG. 12 is a command sequence and a timing chart for explaining the write process in consideration of progress of each channel in the memory system according to the first embodiment.

FIG. 12 is a command sequence and a timing chart showing the write process in the memory system according to the first embodiment. FIG. 12 shows signals DQ and/RB used in a write process, and voltages applied to a selected word line WLsel in accordance with a communication of those signals. Herein, the selected word line WLsel is a word line WL coupled to a memory cell transistor MT targeted for a write process. Each of FIGS. 12(A) and 12(B) shows a write process corresponding to S34 of FIG. 11 (where data is written) and a write process corresponding to S32 (where NULL data is written), respectively.

In the descriptions hereinafter, for the sake of explanation, a case where a TLC mode is adopted as a write mode and three physical pages in response to a single CNT write command are written will be described.

First, an example of data writing is described with reference to FIG. 12(A).

As shown in FIG. 12(A), the CNT write command issuance unit 320 sequentially sends, to the NAND flash memory 10, command sets CS1, CS2, and CS3 that each instructs a write process. For example, each of the command sets CS1 through CS3 includes one-physical page data of three-physical page write data to be written in a single cell unit CU.

The NAND flash memory 10 temporarily shifts from a ready state to a busy state upon receipt of the command set CS1 and causes the latch circuit (not shown) in the sense amplifier 19 to store a first single-physical page data.

The NAND flash memory 10 temporarily shifts from a ready state to a busy state upon receipt of the command set CS2 and causes the latch circuit (not shown) in the sense amplifier 19 to store a second physical page data.

The NAND flash memory 10 shifts from a ready state to a busy state upon receipt of the command set CS3 and causes the latch circuit (not shown) in the sense amplifier 19 to store a third physical page data. Then, the NAND flash memory 10 commences the write process based on the stored three-physical page data. In the write process, the sequencer 15 iterates a program operation.

The program operation is an operation for raising a threshold voltage of the memory cell transistors MT. In the program operation, for a plurality of write-target memory cell transistors MT coupled to the selected word line WLsel, the rise of a threshold voltage is allowed or prohibited in accordance with each threshold voltage level. In other words, the sequencer 15 sets a memory cell transistor MT in which the threshold voltage has not reached a target value as a program-target, and sets a memory cell transistor MT in which the threshold voltage has not reached a target value to a program-prohibited state.

In the program operation, the voltage to be applied to the selected word line WLsel is raised from the voltage VSS to the program voltage VPGM. The voltage VSS is a ground voltage (for example, 0 V), and the program voltage VPGM is a high voltage at a level that allows for the raising of threshold voltages of the memory cell transistors MT. When the program voltage VPGM is applied to the selected word line WLsel, the threshold voltage of the memory cell transistor MT coupled to the selected word line WLsel and set as program-target rises. On the other hand, the rise of the threshold voltage is suppressed in the memory cell transistor MT coupled to the selected word line WLsel and set as program-prohibited because the NAND string NS that includes the memory cell transistor MT is controlled to be in a floating state.

The program voltage VPGM is stepped up every time a program operation is repeated. In other words, the program voltage VPGM applied to the selected word line WLsel is increased in accordance with the number of times a program operation is performed.

During the repetition of the program operation, when the sequencer 15 detects that the number of memory cell transistors MT not yet reaching a target state is less than a certain number, or that the write process exceeds a write time upper limit value notified from the memory controller 30, the sequencer 15 ceases the write process and changes the NAND flash memory 10 from a busy state to a ready state.

In the case of writing data, the write time upper limit value is set at a length to the extent that allows the number of memory cell transistors MT not yet reaching a target state to be sufficiently less than the certain number. For this reason, it is possible to write three-physical page data to the selected cell unit CU within the write time upper limit value. The shown write time tPROG0 corresponds to a length of time required to write three-physical page data.

Next, a case where NULL data is written is described with reference to FIG. 12(B).

As shown in FIG. 12(B), the CNT write command issuance unit 320 sequentially sends, to the NAND flash memory 10, command sets CS1a, CS2a, and CS3a. For example, each of the command sets CS1a through CS3a includes one-physical page data of the NULL data of three physical pages to be (but, in fact, not actually) written to a single cell unit CU. The operation of inputting data into the sense amplifier 19 based on the command sets CS1a through CS3a is the same as that in FIG. 12(A).

If three-physical page data written into a single cell unit CU comprises all NULL data, a target state for all memory cell transistors MT in the cell unit CU may be, for example, an erase state. Thus, the rises in threshold voltages are suppressed in all memory cell transistors MT coupled to the selected word lines WLsel and targeted for writing. For this reason, in the NULL data write process, the sequencer 15 detects that, before starting application of the program voltage VPGM, the number of the memory cell transistors MT that have not reached a target state is less than the certain number, and ceases the write process.

As described above, in the NULL data write process, a write time upper limit value shorter than that in the write data write process is set. For this reason, even in a case where a target state of the NULL data write process is a state other than an erase state, the sequencer 15 forcibly ceases the write process after the program operation is performed at the lower number of times than that in the write data write process.

Thus, the write time tPROG1 in the NULL data write process can be made shorter than the write time tPROG0 in the write data write process.

1.4 Advantageous Effects of First Embodiment

According to the first embodiment, when multiple write processes are performed in parallel on the channels CH0 through CH3, the write progress management unit 311 updates the progress management table 313 every time the write process is finished. The write data management unit 312 and the NAND parameter processing unit 340 reduce the write time upper limit value of the channel CH updated with progress if there is a channel CH in which the number of write-completed logical pages is greater by at least a certain threshold than that in the channel CH updated with progress. The write data management unit 312 and the CNT write command issuance unit 320 issue a CNT write command to write NULL data into a channel CH updated with progress if there is a channel CH in which the number of write-completed logical pages is greater by at least a certain threshold than that in the channel CH updated with progress. It is thereby possible to suppress an excess of the differences in progress in the write process between the channels CH over a threshold. It is thereby possible to suppress a decrease in data writing speed.

The above-described advantageous effects will be further explained with reference to FIGS. 13 and 14.

FIG. 13 is a schematic diagram for explaining the write process performed in the memory system according to a comparative example. FIG. 13 shows, as a comparative example, an example where the setting of the write process is not changed based on the differences in progress in the write process between the channels CH.

As shown in FIG. 13, at time T0, the write process is simultaneously commenced in the channels CH0 through CH3.

From time T1 to time T5, a write process corresponding to a single logical page LPG is completed in the channels CH1 through CH3 and the channel CH0 in an alternating manner. However, as shown in the example of FIG. 13, if the speed of the write process performance in the channel CH0 is slower than that in the channels CH1 through CH3, the differences in progress between the channel CH0 and the channels CH1 through CH3 become greater. Then, at time T6, in the channels CH1 through CH3, the write process corresponding to the logical page LPG3 is finished before the write page corresponding to the logical page LPG2 in the channel CH0 is finished.

At time T6, write data of the logical pages LPG2 and LPG3 is stored in the write buffer 330. For this reason, in order to commence the write process corresponding to the logical page LPG4 in the channels CH1 through CH3, it is necessary to erase or invalidate the write data of the logical page LPG2 in the write buffer 330. However, as described above, the write buffer 330 is unable to erase or invalidate the corresponding write data until the write process for a single logical page is completed, for example. For this reason, in the channels CH1 through CH3, the write process corresponding to the logical page LPG4 cannot be commenced until time T7 when the write page corresponding to the logical page LPG2 in the channel CH0 is completed.

Similarly, at the time of time T8 when the write process corresponding to the logical page LPG4 in the channels CH1 through CH3 is completed, the logical pages LPG3 and LPG4 are stored in the write buffer 330. However, in the channels CH1 through CH3, the write process corresponding to the logical page LPG5 cannot be commenced until time T9 when the write page corresponding to the logical page LPG3 in the channel CH0 is completed.

Thus, if the channel CH0 exhibits a slower performance speed than that in the channels CH1 through CH3, this may limit the writing speed in the channels CH1 through CH3 other than the channel CH0, which is not a preferable situation.

Furthermore, the above example describes a case in which a write process cannot be performed for a new logical page LPG due to the limitations relating to the memory size of the write buffer 330; however, the factors that limit the performance of the write process are not limited to the memory size of the write buffer 330. For example, even if new write data from the host device 2 can be stored in the write buffer 330, there is a case where the write process corresponding to the new logical page LPG cannot be performed when the number of logical pages LPG under the process of writing the write data stored in the write buffer 330 reaches an upper limit.

In either case, if there are differences in the write process performance speed between the channels CH, the write process for a new logical page LPG in a channel CH with the fastest writing speed may be limited by the other slow channels CH, which is not a preferable situation.

Figure 14:
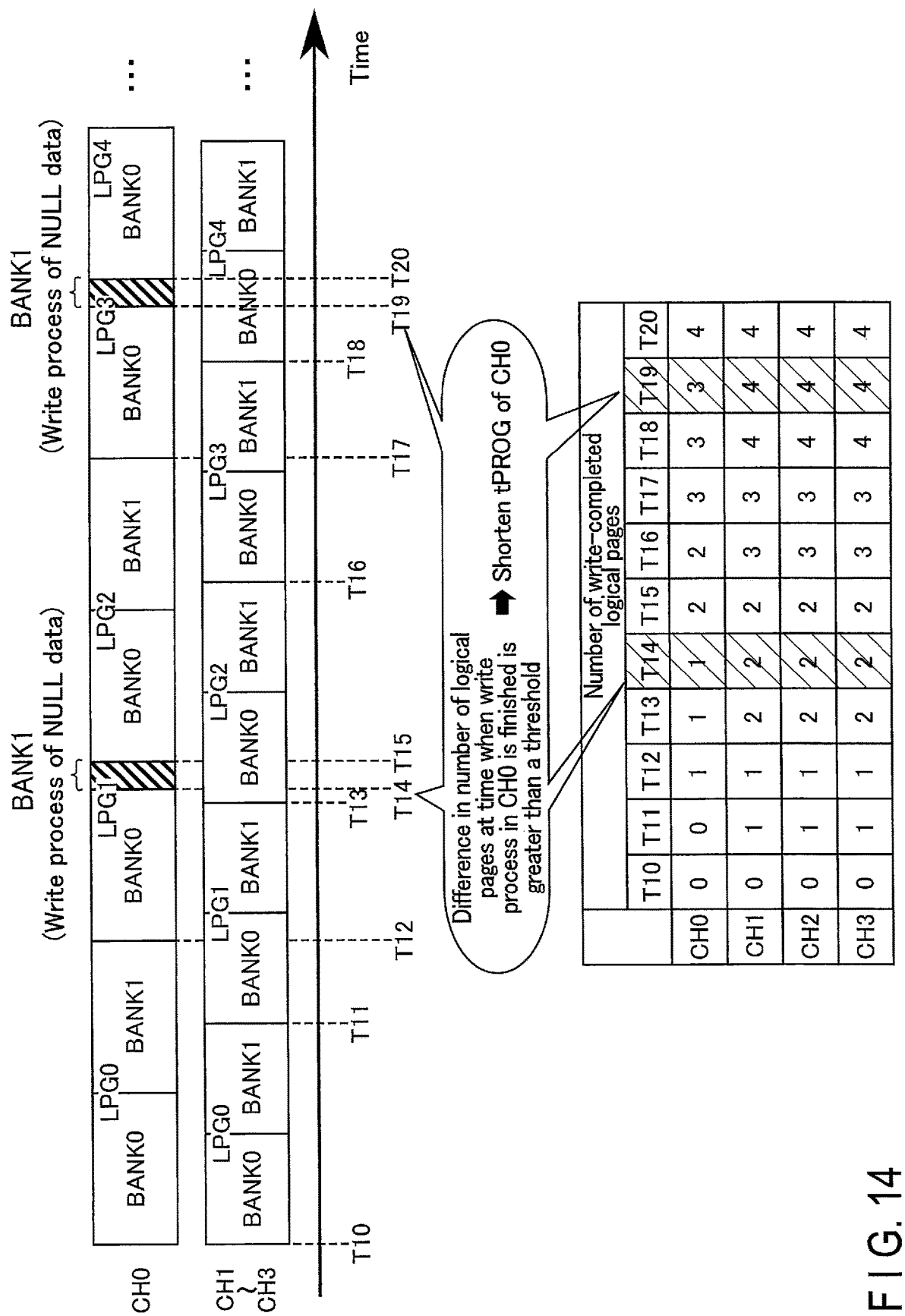
FIG. 14 is a schematic diagram for explaining the write process performed by the memory system according to the first embodiment.

FIG. 14 is a schematic diagram for explaining the write process performed by the memory system according to the first embodiment. In the example of FIG. 14, in the write data management unit 312, the threshold applied for the determination in S50 in FIG. 10 is set to "1".

As shown in FIG. 14, the operation from time T10 to time T13 in FIG. 14 is the same as the operation from time T0 to time T3 in FIG. 13.

At time T13, upon completion of the write process corresponding to the logical page LPG1 in the channels CH1 through CH3, the write progress management unit 311 updates the progress management table 313. As a result, in the progress management table 313, the number of write-completed logical pages in each of the channels CH1 through CH3 becomes "2".

At time T14, the write process corresponding to the bank BANK0 of the logical page LPG1 is completed in the channel CH0. At time T14, since not all the write processes corresponding to the logical page LPG1 have yet been completed in the channel CH0, the number of write-completed logical pages in the channel CH0 remains "1". For this reason, the write data management unit 312 determines that the number of write-completed logical pages "2" in the channels CH1 through CH3 is greater than the number of write-completed logical pages "1" in the channel CH0 by at least the threshold "1". Thereafter, the write data management unit 312 instructs the NAND parameter processing unit 340 to reduce the write time upper limit value of the channel CH0. The write data management unit 312 instructs the CNT write command issuance unit 320 to write NULL data in the write process corresponding to the bank BANK1 of the logical page LPG1 in the channel CH0.

With the above-described operation, at time T14, NULL data is written in the write process corresponding to the bank BANK1 of the logical page LPG1 in the channel CH0. It is thereby possible to complete the write process corresponding to the logical page LPG1 in the channel CH0 at time T15 within a shorter write time than usual. For this reason, the write buffer 330 can erase or invalidate the write data corresponding to the logical page LPG1 and newly store the write data corresponding to the logical page LPG3. Thus, at time T16, in the channels CH1 through CH3, the write process corresponding to the logical page LPG3 can be commenced immediately after the write process corresponding to the logical page LPG2 is completed, without being limited by the writing speed in the channel CH0.

At time T15, the write data management unit 312 determines that, in the write process corresponding to the bank BANK0 of the logical page LPG2 in the channel CH0, the number of write-completed logical pages "2" in channel CH0 is not less than the number of write-completed logical pages "2" in each of the channels CH1 through CH3 by the threshold "1". Thereafter, the write data management unit 312 instructs the NAND parameter processing unit 340 to increase the reduced write time upper limit value of the channel CH0 so as to return the value to the original value. The write data management unit 312 instructs the CNT write command issuance unit 320 to change data content from the NULL data to the write data in the write process corresponding to the bank BANK1 of the logical page LPG2 in the channel CH0. It is thereby possible to perform a normal write process again in the channel CH0 at time T15 and thereafter.

Subsequently, at time T17, upon completion of the write process corresponding to the logical page LPG2 in the channel CH0, the write progress management unit 311 updates the progress management table 313. As a result, in the progress management table 313, the number of write-completed logical pages in each of the channels CH0 becomes "3".

At time T18, upon completion of the write process corresponding to the logical page LPG3 in the channels CH1 through CH3, the write progress management unit 311 updates the progress management table 313. As a result, in the progress management table 313, the number of write-completed logical pages in each of the channels CH1 through CH3 becomes "4".

At time T19, the write process corresponding to the bank BANK0 of the logical page LPG3 is completed in the channel CH0. At time T19, since not all the write processes corresponding to the logical page LPG3 have yet been completed in the channel CH0, the number of write-completed logical pages in the channel CH0 remains "3". For this reason, the write data management unit 312 determines that the number of write-completed logical pages "4" in the channels CH1 through CH3 is greater than the number of write-completed logical pages "3" in the channel CH0 by at least the threshold "1". Thereafter, similarly to the operation at time T14, the write data management unit 312 instructs the NAND parameter processing unit 340 to reduce the write time upper limit value of the channel CH0. The write data management unit 312 instructs the CNT write command issuance unit 320 to write NULL data in the write process corresponding to the bank BANK1 of the logical page LPG3 in the channel CH0.

With the above-described operation, at time T19, NULL data is written in the write process corresponding to the bank BANK1 of the logical page LPG3 in the channel CH0. It is thereby possible to complete the write process corresponding to the logical page LPG3 channel CH0 at time T20 within a shorter write time than usual.

Thus, according to the first embodiment, it is possible to suppress occurrence of a time range in which the write processes in the channels CH1 through CH3, in which the writing speeds are fast, are limited by the channel CH0 in which the writing speed is slow. It is thereby possible to suppress a decrease in writing speed. Furthermore, since NULL data is written in the channel CH0 to adjust the progress, degradation in data reliability due to progress adjustment can be suppressed. The write data management unit 312 excludes the write data scheduled to be written in the bank BANK1 of each of the logical pages LPG1 and LPG3 of the channel CH0, in which the NULL data is written from the target of invalidation or erasure, so as to allocate the excluded write data to a different memory space. In other words, the write data scheduled to be written is allocated to a different memory space in the NAND flash memory 10, without being invalidated or erased. For this reason, it is possible to suppress reduction of a writing speed without losing the write data in the memory system 1.

2. Second Embodiment

Next, a memory system according to a second embodiment will be described. The first embodiment explains a case where an excess of differences in progress over a threshold is suppressed by writing NULL data in a channel CH where the write process progress is most delayed. The second embodiment differs from the first embodiment in that an excess of differences in progress over a threshold is suppressed while write data is being written in a channel CH in which the progress in the write process is most delayed. Hereinafter, the same configurations and operations as those of the first embodiment will be omitted, and the configurations differing from those of the first embodiment will be mainly described.

2.1 Flowcharts

Figure 15:
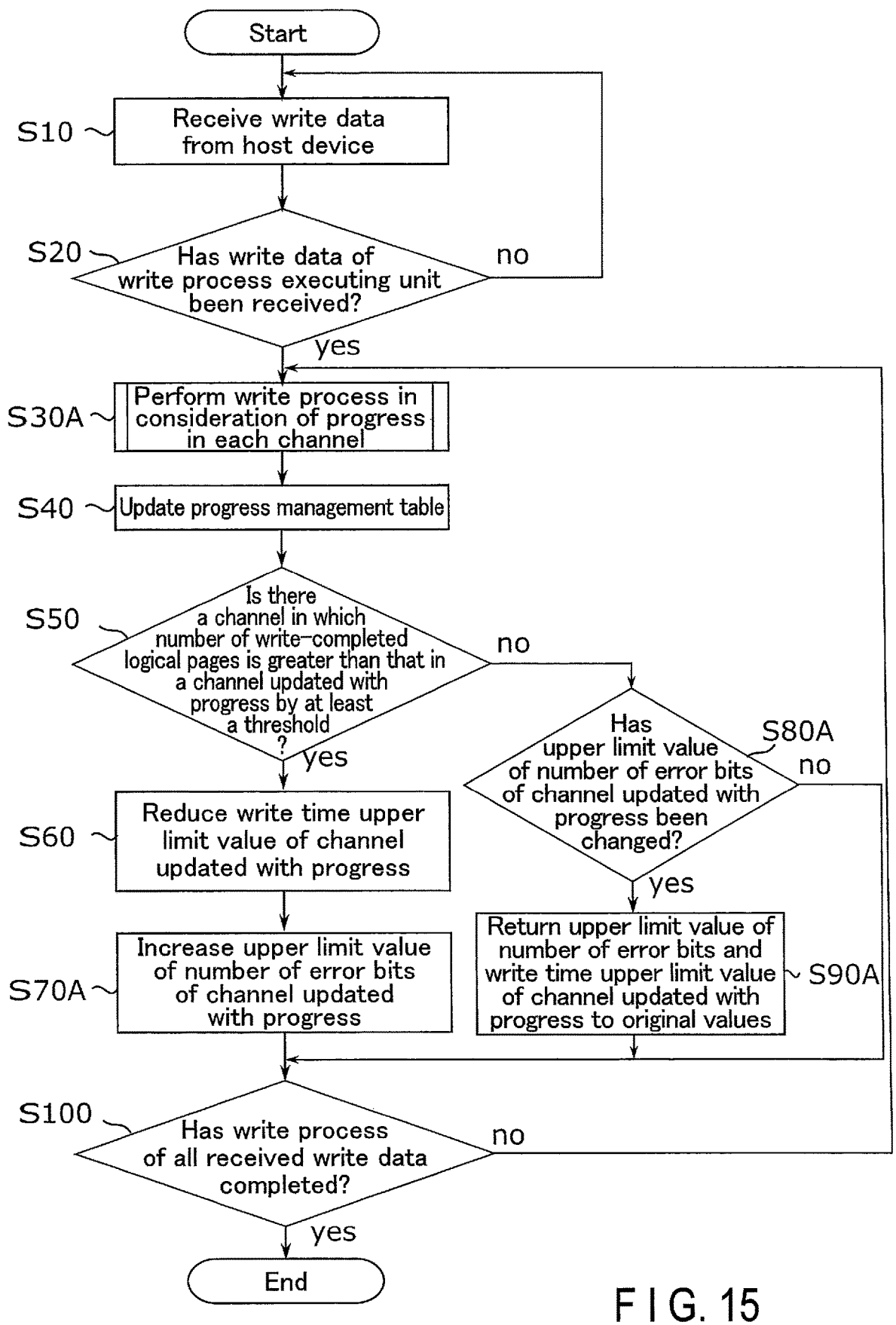
FIG. 15 is a flowchart for explaining a write process performed by a memory system according to a second embodiment.
Figure 16:
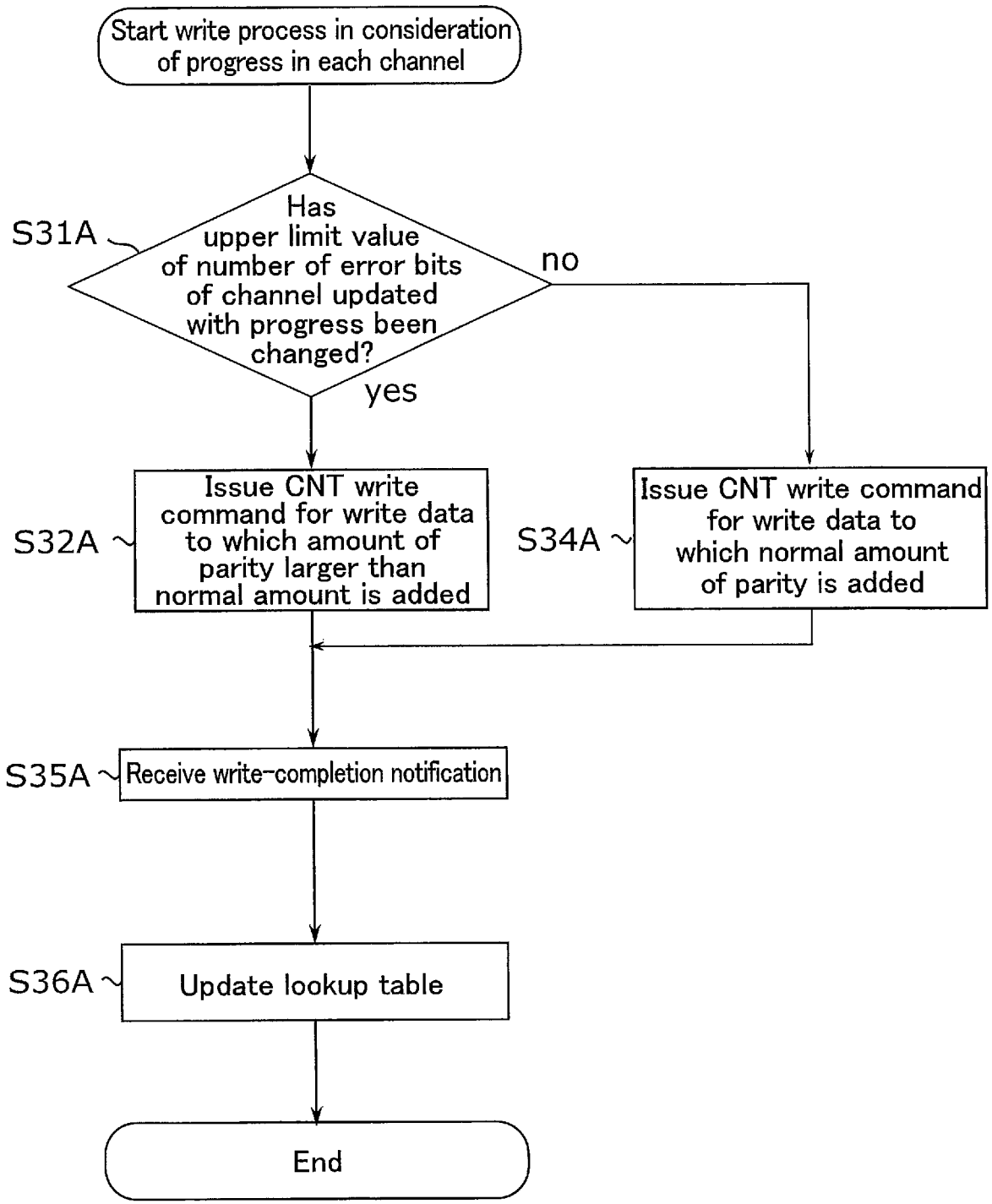
FIG. 16 is a flowchart for explaining a write process in consideration of progress of each channel in the memory system according to the second embodiment.

FIGS. 15 and 16 are flowcharts showing a write process in the memory system according to the second embodiment, and correspond to FIGS. 10 and 11 in the first embodiment.

As shown in FIG. 15, in S10 and S20, the host write command processing unit 310 receives write data of an executing unit of the write process from the host device 2. The operations in S10 and S20 are the same as those in S10 and S20 of FIG. 10.

In S30A, the CNT write command issuance unit 320 performs a write process in consideration of the progress of each channel CH, based on an instruction from the host write command processing unit 310. The details of S30A will be described later with reference to FIG. 16. In the write process in S30A, the memory controller 30 receives a write-completion notification from the NAND flash memory 10.

In S40, the write progress management unit 311 updates the progress management table 313 based on the write-completion notification.

In S50, the write data management unit 312 refers to the progress management table 313 updated in S40 and determines whether or not there exists a channel CH in which the number of write-completed logical pages is greater, by at least a threshold, than that in the channels CH updated with progress.

If there is a channel CH in which the number of write-completed logical pages is greater, by at least a threshold, than that in the channels CH updated with progress (S50; Yes), the process proceeds to S60. In S60, the NAND parameter processing unit 340 reduces the write time upper limit value of the channel CH updated with progress in accordance with the instruction from the write data management unit 312. Subsequently, in S70A, the logical block management unit 350 increases the upper limit value of the number of error bits of the channel CH updated with progress in accordance with the instruction from the write data management unit 312. When S70A is completed, the process proceeds to S100.

On the other hand, if there is no channel CH in which the number of write-completed logical pages is greater by at least a threshold than that in the channels CH updated with progress (S50; No), the process proceeds to S80A. In S80A, the write data management unit 312 determines whether or not the upper limit value of the number of error bits of the channel CH updated with progress has been changed.

If the upper limit value of the number of error bits has been changed (S80A; Yes), the process proceeds to S90A. In S90A, each of the NAND parameter processing unit 340 and the logical block management unit 350 returns the write time upper limit value and the upper limit value of the number of error bits of the channel CH updated with progress to the originally set values in accordance with the instruction from the write data management unit 312. When S90A is completed, the process proceeds to S100. If the upper limit value of the number of error bits of the channel CH updated with progress is unchanged (S80A; No), the process omits S90A and proceeds to S100.

Since the processing in S100 is the same as that in S100 of FIG. 10 in the first embodiment, description is omitted.

The write process is thus finished.

In the example of FIG. 15, it is determined in S80A whether or not the upper limit value of the number of error bits has been changed, but the embodiment is not limited to this example. For example, in S80A, the write data management unit 312 may determine whether or not the write time upper limit value of a channel updated with progress has been changed.

Next, the details of S30A shown in FIG. 15 are described with reference to FIG. 16.

As shown in FIG. 16, in S31A, the CNT write command issuance unit 320 determines whether or not the upper limit value of the number of error bits of a write-targeted channel CH has been changed by the logical block management unit 350. If the upper limit value of the number of error bits of the write-targeted channel CH has been changed (increased from the originally set value) (S31A; Yes), the process proceeds to S32A.

In S32A, the CNT write command issuance unit 320 issues a CNT write command that instructs the writing of data to which an amount of parity larger than normal amount is added, and sends the command to the NAND flash memory 10. Thus, the NAND flash memory 10 performs a write process in which write data to which an amount of parity larger than normal amount is added is written in a logical page LPG of the write-targeted channel, and the process proceeds to S35A.

On the other hand, if the upper limit value of the number of error bits of the write-target channel CH has not been changed (namely, if the value has not been increased from an originally set value) (S31A; No), the process proceeds to S34A.

In S34A, the CNT write command issuance unit 320 issues a CNT write command that instructs the writing of data to which the normal amount of parity is added and sends the command to the NAND flash memory 10. Thus, the NAND flash memory 10 performs a write process in which write data to which a normal amount of parity is added, and the process proceeds to S35A.

After the write process is completed, the NAND flash memory 10 sends a write-completion notification to the memory controller 30, and in S35A, the memory controller 30 receives the write-completion notification.

In S3GA, the CNT write command issuance unit 320 issues a CNT write command that instructs the writing of the address update information of write data that has been written in the NAND flash memory 10 and sends the command to the DRAM 20. Thus, the DRAM 20 is updated with the lookup table 200 into which the latest state is incorporated.

The write process in consideration of the progress of each channel CH is thus completed.

2.2 Command Sequence and Timing Chart

FIG. 17 is a command sequence and a timing chart showing the write process in the memory system according to the second embodiment and it corresponds to FIG. 12(B) of the first embodiment. In other words, FIG. 17 shows the write process corresponding to S32A in FIG. 16 (the case of writing write data to which an amount of parity larger than normal amount is added). Since the write process corresponding to S34A in FIG. 16 is the same as the process shown in FIG. 12(A), illustration thereof is omitted.

As shown in FIG. 17, the CNT write command issuance unit 320 sequentially sends, to the NAND flash memory 10, command sets CS1b, CS2b, and CS3b. For example, each of the command sets CS1b through CS3b includes one-physical page data of three-physical page write data to be written in a single cell unit CU. Compared to the case in S34A, the portion of the write data in the input data is small, and the portion of parity is large.

The write time upper limit value tPROG2 set in the case of S32A may be a value smaller than the write time upper limit value tPROG0 in the case of S34A. It is thereby possible to shorten the time required for a write process in the case of S32A; on the other hand, S32A is aborted before a write process is completed.

If a write process is aborted before its completion, the number of memory cell transistors MT in which a threshold voltage has not reached a target state becomes greater, and this leads to the increase of the number of error bits in corresponding physical page data. As described, however, a larger amount of parity is added to the physical page data than to a physical page data written in the case a write process is completed. For this reason, when data read process is performed, it is possible to correct all the error bits which have increased due to the abortion of the write process through using the parity.

2.3 Advantageous Effects of Second Embodiment

According to the second embodiment, the write data management unit 312 and the NAND parameter processing unit 340 reduce the write time upper limit value of the channel CH updated with progress if there is a channel CH in which the number of write-completed logical pages is greater, by at least a certain threshold, than that in the channel CH updated with progress. For this reason, similarly to the first embodiment, it is possible to suppress an excess of differences in progress between channels CH over a threshold.

If there is a channel CH in which the number of write-completed logical pages is greater, by at least a certain threshold, than that in the channel CH updated with progress, the write data management unit 312 and the logical block management unit 350 increase the upper limit value of the number of error bits of the channel CH updated with progress. Even if a write process is aborted before completion, it is thereby possible to correct error bits in the error correction process by the ECC circuit 36 when incomplete data written in the channel CH is read. It is thereby possible to suppress a decrease in data writing speed without degrading the reliability of written data.

3. Third Embodiment

Next, a memory system according to a third embodiment will be described. The third embodiment differs from the first and second embodiments in that the excess of differences in progress over a threshold is suppressed by changing a write mode of a channel CH in which the progress in write process is most delayed. Hereinafter, the same configurations and operations as those of the first embodiment will be omitted, and those differing from those of the first embodiment will be mainly described.

3.1 Flowcharts

Figure 18:
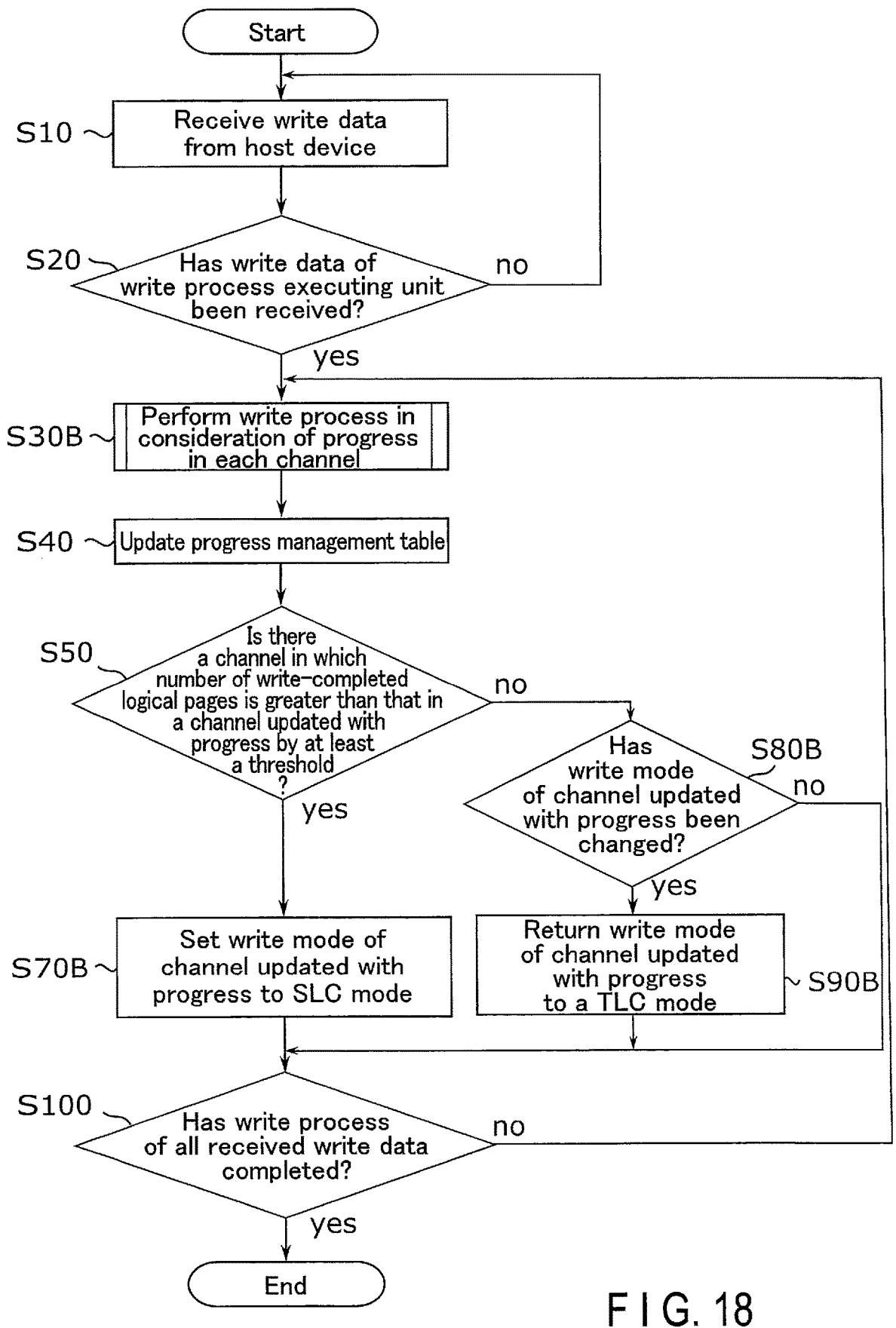
FIG. 18 is a flowchart for explaining a write process performed by a memory system according to a third embodiment.
Figure 19:
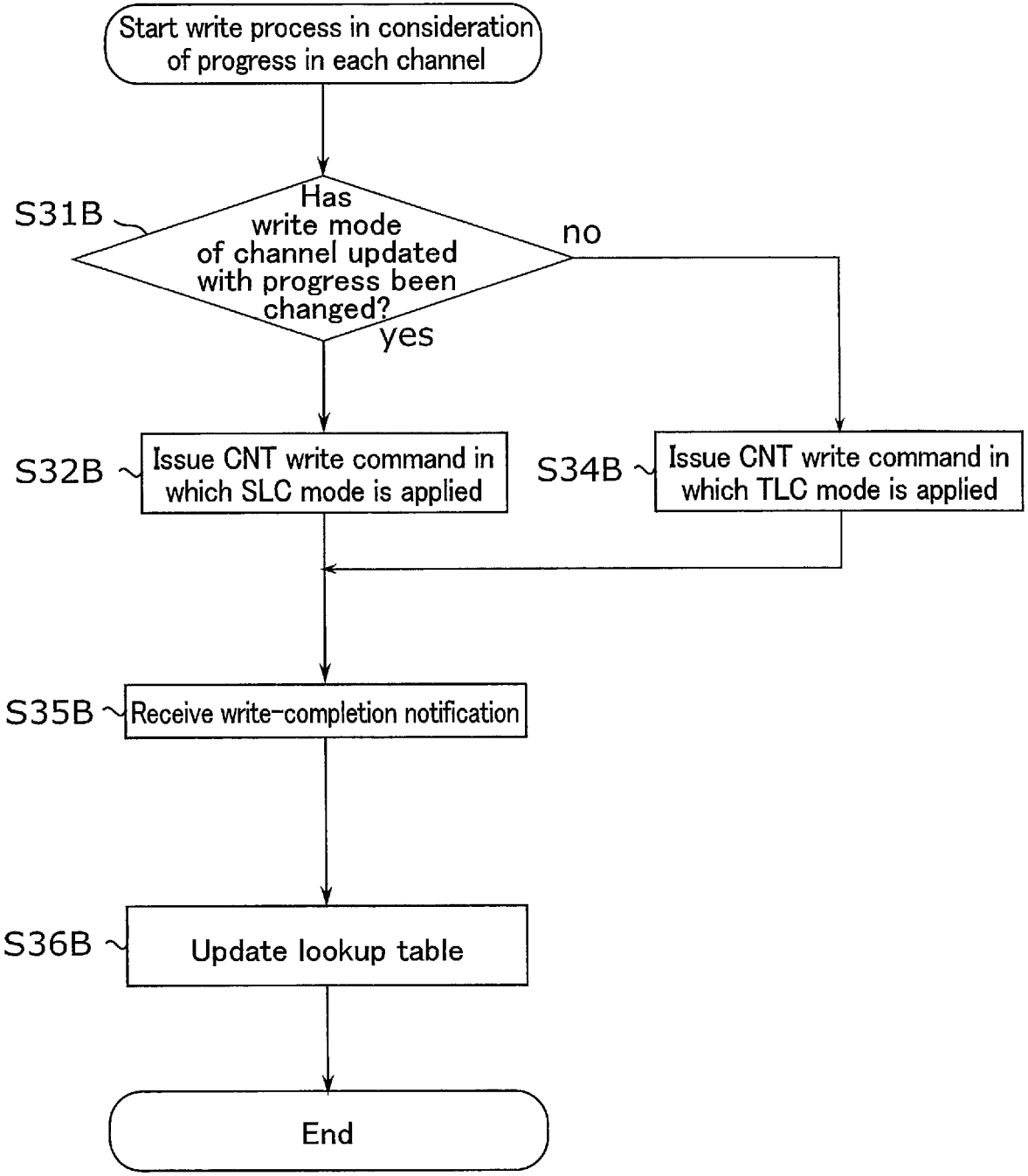
FIG. 19 is a flowchart for explaining a write process in consideration of progress of each channel in the memory system according to the third embodiment.

FIGS. 18 and 19 are flowcharts showing a write process in the memory system according to the third embodiment, and correspond to FIGS. 10 and 11 in the first embodiment.

As shown in FIG. 18, in S10 and S20, the host write command processing unit 310 receives write data of a unit of write process from the host device 2. The operations in S10 and S20 are the same as those in S10 and S20 of FIG. 10.

In S30B, the CNT write command issuance unit 320 performs a write process in consideration of the progress of each channel CH, based on an instruction from the host write command processing unit 310. The details of S30B will be described later with reference to FIG. 19. In the write process in S30B, the memory controller 30 receives a write-complete notification from the NAND flash memory 10.

In S40, the write progress management unit 311 updates the progress management table 313 based on the write-completion notification.

In S50, the write data management unit 312 refers to the progress management table 313 updated in S40, and determines whether or not there is a channel CH in which the number of write-completed logical pages is greater, by at least a certain threshold, than that in the channels CH updated with progress.

If there is a channel CH in which the number of write-completed logical pages is greater, by at least a certain threshold, than that in the channels CH updated with progress (S50; Yes), the process proceeds to S70B. In S70B, the write data management unit 312 sends, to the CNT write command issuance unit 320, an instruction to set the write mode of the channel CH updated with progress to an SLC mode. When S70B is completed, the process proceeds to S100.

On the other hand, if there is no channel CH in which the number of write-completed logical pages is greater than, by at least a certain threshold, than that in the channels CH updated with progress (S50; No), the process proceeds to S80B and S90B. In S80B, the write data management unit 312 determines whether or not the write mode of the channel CH updated with progress has been changed to the SLC mode.

If the write mode has been changed to the SLC mode (S80B; Yes), the process proceeds to S90B. In S90B, the write data management unit 312 sends, to the CNT write command issuance unit 320, an instruction to return the write mode of the channel CH updated with progress to a TLC mode. When S90B is completed, the process proceeds to S100. If the write mode of the channel CH updated with progress has not been changed (S80B; No), the process omits S90B and proceeds to S100.

Since the processing in S100 is the same as S100 of FIG. 10 in the first embodiment, description is omitted.

The write process is thus finished.

Next, the details of S30B shown in FIG. 18 is described with reference to FIG. 19.

As shown in FIG. 19, in S31B, the CNT write command issuance unit 320 determines whether or not the write mode of a write-target channel CH has been changed to the SLC mode. If the write mode of the write-target channel CH has been changed to the SLC mode (S31B; Yes), the process proceeds to S32B.

In S32B, the CNT write command issuance unit 320 applies the SLC mode and issues a CNT write command that instructs data write and sends the command to the NAND flash memory 10. Thus, the NAND flash memory 10 performs a write process of writing 1-bit data in each of the memory cell transistor MT of the write-targeted channel, and the process proceeds to S35B.

On the other hand, if the write mode of the write-target channel CH has not been changed to the SLC mode (S31B; No), the process proceeds to S34B.

In S34B, the CNT write command issuance unit 320 applies the TLC mode, issues a CNT write command that instructs a data write, and sends the command to the NAND flash memory 10. Thus, the NAND flash memory 10 performs a write process in which 3-bit write data is written in each of the memory cell transistors MT of the write-targeted channel, and the process proceeds to S35B.

After the write process is completed, the NAND flash memory 10 sends a write-completion notification to the memory controller 30, and in S35B, the memory controller 30 receives the write-completion notification.

In S36B, the CNT write command issuance unit 320 issues a CNT write command that instructs to write address update information of write data written in the NAND flash memory 10 and sends the command to the DRAM 20. Thus, the DRAM 20 is updated with the lookup table 200 into which the latest state is incorporated.

The write process in consideration of the progress of each channel CH is thus completed.

3.2 Command Sequence and Timing Chart

Figure 20:
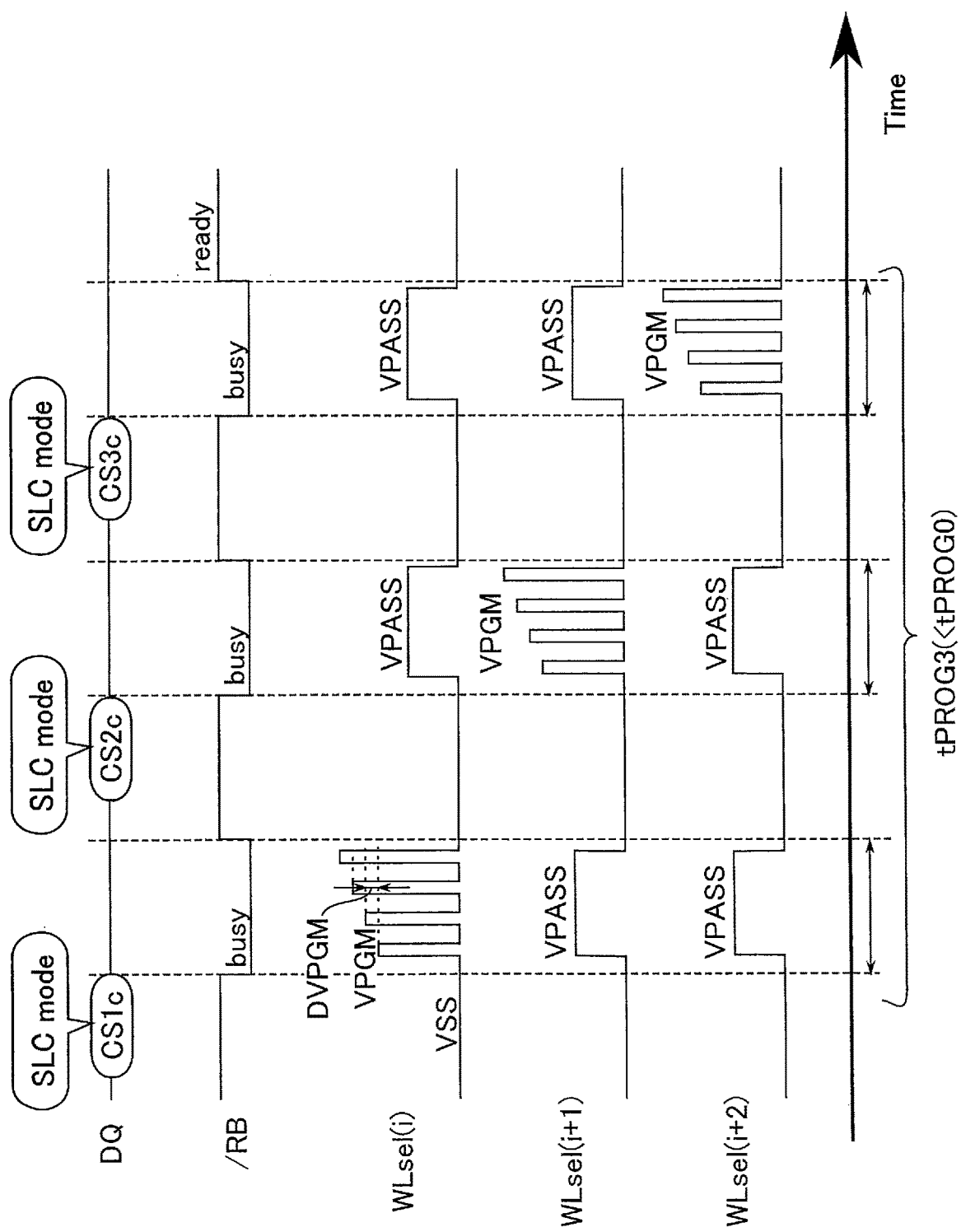
FIG. 20 is a command sequence and a timing chart for explaining the write process in consideration of progress of each channel in the memory system according to the third embodiment.

FIG. 20 is a command sequence and a timing chart showing the write process in the memory system according to the third embodiment, and which corresponds to FIG. 12(B) of the first embodiment. In other words, FIG. 20 shows the write process corresponding to S32B in FIG. 19 (the case of applying the SLC mode). Since the write process corresponding to S34B in FIG. 19 is the same as the process shown in FIG. 12(A), illustration thereof is omitted.

As shown in FIG. 20, the CNT write command issuance unit 320 sequentially sends, to the NAND flash memory 10, command sets CS1$c$, CS2$c$, and CS3$c$. For example, each of the command sets CS1$c$ through CS3$c$ includes one-physical page data to be written in a single cell unit CU. The NAND flash memory 10 performs a write process in which the SLC mode is applied every time the command sets CS1$c$ through CS3$c$ are received.

Upon receipt of the command set CS1$c$, the NAND flash memory 10 shifts from a ready state to a busy state and commences a write process based on one-physical page data. The row decoder 18 repeatedly applies the program voltage VPGM to a corresponding selected word line WLsel(i). Herein, the selected word line WLsel(i) means that the word line WLi is selected ($0 \le i \le 5$). The row decoder 18 applies a voltage VPASS to non-selected word lines WL (word lines other than the selected word line WLsel(i)). The voltage VPASS is a voltage that turns the memory cell transistor MT to an "on" state regardless of its threshold voltage, and does not raise the threshold voltage of a non-target memory cell transistor MT. After the write process for the selected word line WLsel(i) is finished, the sequencer 15 shifts the NAND flash memory 10 from the busy state to the ready state.

Subsequently, upon receipt of the command sets CS2$c$ and CS3$c$, the NAND flash memory 10 shifts from a ready state to a busy state and commences a write process based on one-physical page data for each of the selected word lines WLsel(i+1) and WLsel(i+2), respectively. The program operation is the same as that performed when a command set CS1$c$ is received.

With the above-described operation, the write data of three physical pages corresponding to the command sets CS1$c$ through CS3$c$ is written in the NAND flash memory 10 during the write time tPROG3. Herein, when write data of the same number of physical pages (or logical pages LPG) is written, the write time tPROG3 in the case of applying the SLC mode can be shortened by more than the write time tPROG0 in the case of applying the TLC mode. It is thus possible to increase the write process speed more when the SLC mode is applied than when the TLC mode is applied.

3.3 Advantageous Effects of Third Embodiment

According to the third embodiment, the write data management unit 312 and the CNT write command issuance unit 320 issue a CNT write command to apply the SLC mode to a channel CH updated with progress if there is a channel CH in which the number of write-completed logical pages is greater, by at least a certain threshold, than that in the channel CH updated with progress. For this reason, similarly to the first embodiment, it is possible to suppress an excess of differences in progress between channels CH over a threshold.

When the SLC mode is applied, although the number of cell units CU used in the write process is increased, it is possible to write data without aborting the write process. For this reason, without changing the setting of the upper limit value of the number of error bits and the write time upper limit value, degradation in writing speed and reliability of the written data can be suppressed.

4. Modifications, Etc

Various modifications can be made to the foregoing embodiments.

4.1 First Modification

For example, in the foregoing first and second embodiments, the differences in progress between the channels CH are adjusted by reducing the write time upper limit value of a channel CH updated with progress; however, the embodiments are not limited to this example. For example, the differences in progress between the channels CH may be adjusted by increasing the write time upper limit value of the channel CH updated with progress.

Figure 21:
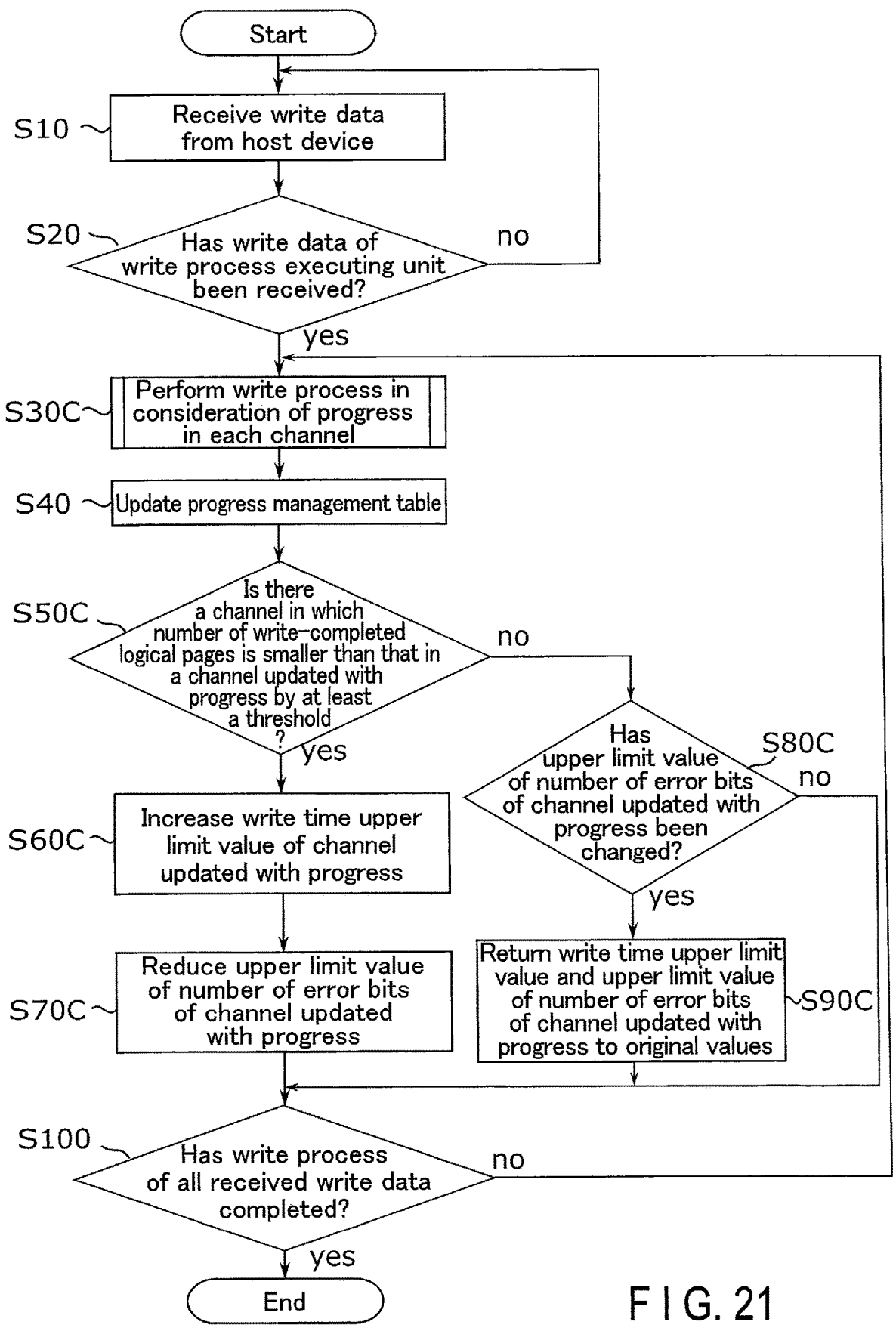
FIG. 21 is a flowchart for explaining a write process performed by a memory system according to a first modification.
Figure 22:
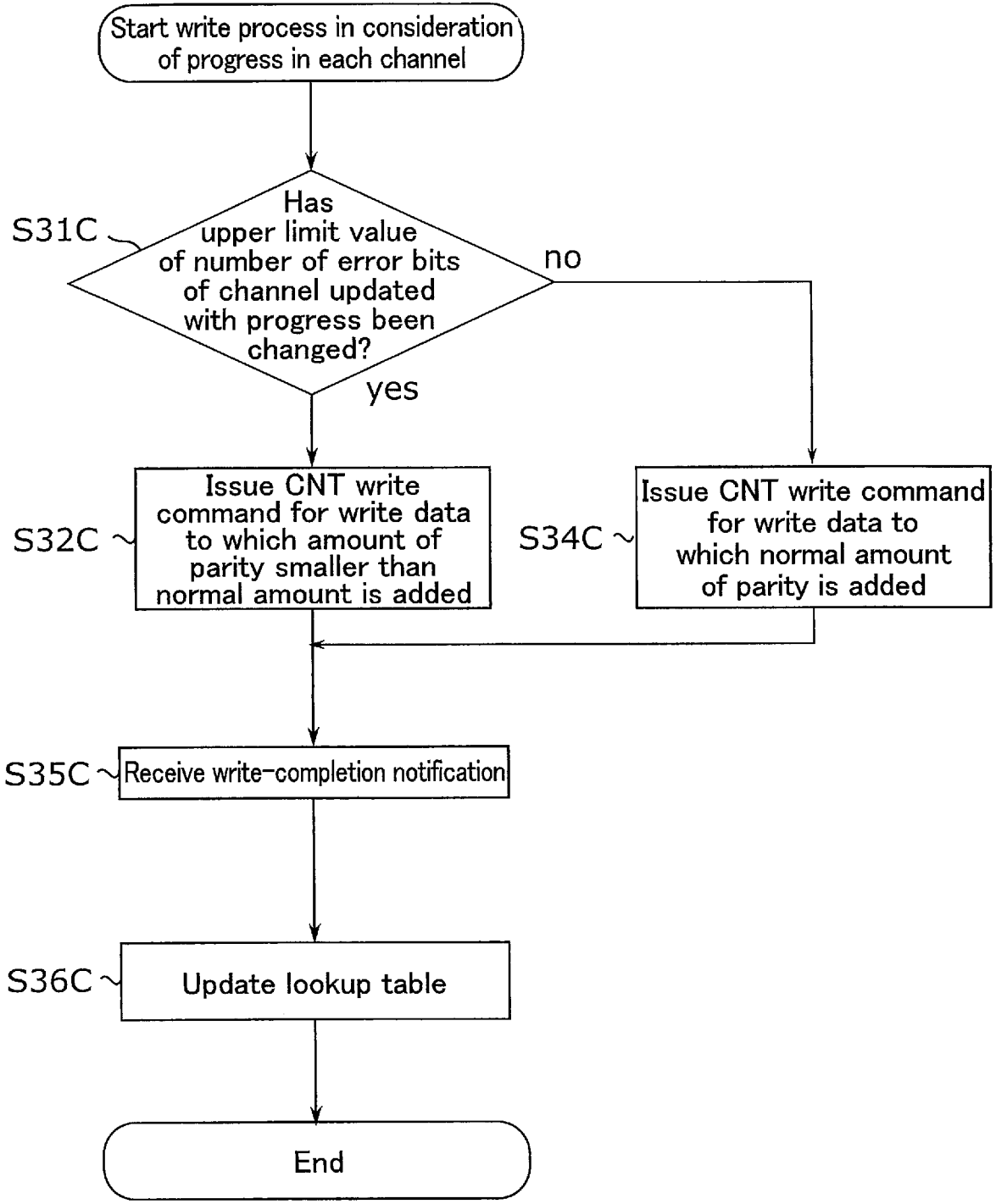
FIG. 22 is a flowchart for explaining a write process in consideration of progress of each channel in the memory system according to the first modification.

FIGS. 21 and 22 are flowcharts showing a write process in the memory system according to a first modification, and correspond to FIGS. 15 and 16 in the second embodiment, respectively.

As shown in FIG. 21, since S10 and S20 are equivalent to those in FIG. 15, the description thereof is omitted.

In S30C, the CNT write command issuance unit 320 performs a write process in consideration of the progress of each channel CH, based on an instruction from the host write command processing unit 310. The details of S30C will be described later with reference to FIG. 22. In the write process in S30C, the memory controller 30 receives a write-completion notification from the NAND flash memory 10.

In S40, the write progress management unit 311 updates the progress management table 313 based on the write-completion notification.

In S50C, the write data management unit 312 refers to the progress management table 313 updated in S40, and determines whether or not there is a channel CH in which the number of write-completed logical pages is smaller, by at least a certain threshold, than that in the channels CH updated with progress.

If there is a channel CH in which the number of write-completed logical pages is smaller, by at least a certain threshold, than that in the channels CH updated with progress (S50C; Yes), the process proceeds to S60C. In S60C, the NAND parameter processing unit 340 increases the write time upper limit value of the channel CH updated with progress in accordance with the instruction from the write data management unit 312. Subsequently, in S70C, the logical block management unit 350 reduces the upper limit value of the number of error bits of the channel CH updated with progress in accordance with the instruction from the write data management unit 312. When S70C is completed, the process proceeds to S100.

On the other hand, if there is no channel CH in which the number of write-completed logical pages is smaller, by at least a certain threshold, than that in the channels CH updated with progress (S50C; No), the process proceeds to S80C. In S80C, the write data management unit 312 determines whether or not the upper limit value of the number of error bits of the channel CH updated with progress has been changed.

If the upper limit value of the number of error bits has been changed (S80C; Yes), the process proceeds to S90C. In S90C, each of the NAND parameter processing unit 340 and the logical block management unit 350 returns the write time upper limit value and the upper limit value of the number of error bits of the channel CH updated with progress to the originally set values in accordance with the instruction from the write data management unit 312. When S90C is completed, the process proceeds to S100. If the upper limit value of the number of error bits of the channel CH updated with progress has not been changed (S80C; No), the process omits S90C and proceeds to S100.

Since the processing in S100 is the same as S100 of FIG. 10 in the first embodiment, description is omitted.

The write process is thus finished.

In the example of FIG. 21, it is determined in S80C whether or not the upper limit value of the number of error bits has been changed, but the embodiment is not limited to this example. For example, in S80C, the write data management unit 312 may determine whether or not the write time upper limit value of a channel updated with progress has been changed.

Next, the details of S30C shown in FIG. 21 is described with reference to FIG. 22.

As shown in FIG. 22, in S31C, the CNT write command issuance unit 320 determines whether or not the upper limit value of the number of error bits of a write-target channel CH has been changed by the logical block management unit 350. If the upper limit value of the number of error bits of the write-targeted channel CH has been changed (reduced from the originally set value) (S31C; Yes), the process proceeds to S32C.

In S32C, the CNT write command issuance unit 320 issues a CNT write command that instructs to write data to which an amount of parity smaller than normal amount of parity is added and sends the command to the NAND flash memory 10. Thus, the NAND flash memory 10 performs a write process in which write data to which an amount of parity smaller than normal amount is added is written in a logical page LPG of the write-targeted channel, and the process proceeds to S35C.

On the other hand, if the upper limit value of the number of error bits of the write-target channel CH has not been changed (namely, if the value has not been reduced from an originally set value) (S31C; No), the process proceeds to S34C.

In S34C, the CNT write command issuance unit 320 issues a CNT write command that instructs the writing of data to which a normal amount of parity is added and sends the command to the NAND flash memory 10. Thus, the NAND flash memory 10 performs a write process of writing write data to which a normal amount of parity is added, and the process proceeds to S35C.

After the write process is completed, the NAND flash memory 10 sends a write-completion notification to the memory controller 30, and in S35C, the memory controller 30 receives the write-completion notification.

In S36C, the CNT write command issuance unit 320 issues a CNT write command that instructs the writing of address update information of write data written in the NAND flash memory 10, and sends the command to the DRAM 20. Thus, the DRAM 20 is updated with the lookup table 200 into which the latest state is incorporated.

The write process in consideration of the progress of each channel CH is thus completed.

According to the first modification, it is possible to suppress an excess of the differences in progress between the channels CH over a threshold through increasing the write time upper limit value of a channel CH having a fast write speed. It is thereby possible to suppress occurrence of a period during which the writing speed is limited by a slow channel CH, similarly to the foregoing first through third embodiments.

Through increasing the write time upper limit value, the possibility of aborting a program operation can be lowered. Thus, it is possible to write data without degrading the reliability of the write data, even when the upper limit value of the number of error bits is reduced. Therefore, it is possible to suppress an increase in an amount of memory size used by the parity in the memory cell array 11.

4.2. Others

In the foregoing first through third embodiments, the example where the TLC mode is applied as the setting of a normal write process; however, the embodiment is not limited thereto. For example, as the setting of a normal write process, an MLC mode or a write mode for storing four-bit or larger data may be applied to the NAND flash memory 10.

In the foregoing third embodiment, the example where the write mode is changed to the SLC mode to adjust the differences in progress is described; however, the embodiments are not limited thereto. In other words, to adjust the differences in progress, a write mode for storing data of fewer bits than that in a normal write process may be applied.

In the foregoing first through third embodiments, the examples where the write progress management unit 311 manages the number of write-completed logical pages as the differences in progress are described; however, the embodiments are not limited thereto. For the differences in progress, a discretionarily-selected parameter capable of ascertaining differences in writing speed of a write process between channels CH may be adopted. For example, the write progress management unit 311 may manage an accumulated value of the write time, the number of issued CNT write commands, etc., instead of the number of write-completed logical pages.

While certain embodiments have been described, these embodiments have been presented by way of example only, and are not intended to limit the scope of the inventions. These embodiments may be implemented in various other forms, and various omissions, replacements, and changes can be made without departing from the gist of the invention.

What is claimed is:

1. A memory system comprising:
   a first nonvolatile memory and a second nonvolatile memory each including a plurality of memory cells; and
   a memory controller configured to perform, in parallel, a first set of write processes sequentially performed on the first nonvolatile memory, and a second set of write processes sequentially performed on the second nonvolatile memory,
   wherein the memory controller is configured to change a setting of at least one unperformed write process among the first set of write processes and the second set of write processes based on differences in progress between the first set of write processes and the second set of write processes, the first set of write processes and the second set of write processes being performed in parallel.

2. The memory system according to claim 1, wherein the differences in progress include a difference between a first number and a second number, the first number corresponding to the number of performed write processes in the first set of write processes, the second number corresponding to the number of performed write processes in the second set of write processes.

3. The memory system according to claim 2, wherein the setting changing includes changing of an upper limit value for a time allocated for a write process, and when the first number is greater than the second number by at least a threshold, the memory controller is configured to reduce a first upper limit value to be smaller than a second upper limit value, the first upper limit value being allocated for at least one unperformed write process among the second set of write processes, the second upper limit value being allocated for a performed write process among the second set of write processes.

4. The memory system according to claim 2, wherein the setting changing further includes changing of data to be written into the first nonvolatile memory or the second nonvolatile memory, and when the first number is greater than the second number by at least a threshold, the memory controller is configured to write NULL data into the second nonvolatile memory in at least one unperformed write process among the second set of write processes.

5. The memory system according to claim 2, wherein the setting changing further includes changing of an upper limit value of a correctable number of error bits, and if the first number is greater than the second number by at least a threshold, the memory controller is configured to increase a third upper limit value to be greater than a fourth upper limit value, the third upper limit value being allocated for at least one unperformed write process among the second set of write processes, the fourth upper limit value being allocated for a performed write process among the second set of write processes.

6. The memory system according to claim 2, wherein the setting changing includes changing of an upper limit value for a time allocated for a write process, and when the first number is greater than the second number by at least a threshold, the memory controller is configured to increase a first upper limit value to be greater than a second upper limit value, the first upper limit value being allocated for at least one unperformed write process among the first set of write processes, the second upper limit value being allocated for a performed write process among the first set of write processes.

7. The memory system according to claim 2, wherein the changing of setting further includes changing of a number of bits of data to be written into the memory cells in the first nonvolatile memory or the second nonvolatile memory, and when the first number is larger than the second number by at least a threshold, the memory controller is configured to reduce a third number to be smaller than a fourth number, the third number being a number of bits of data to be written into each of the memory cells of the second nonvolatile memory in at least one unperformed write process among the second set of write processes, the fourth number being a number of bits of data to be written into each of the memory cells in the second nonvolatile memory in a performed write process among the second set of write processes.

8. The memory system according to claim 2, wherein
the memory controller is configured to perform the first set of write processes to the first nonvolatile memory and the second set of write processes to the second nonvolatile memory in units of a logical page, and
each of the first number and the second number is a number of the logical pages.

9. The memory system according to claim 1, wherein
the memory controller is configured to:
couple to the first nonvolatile memory via a first channel, and couple to the second nonvolatile memory via a second channel; and
instruct the first set of write processes to the first nonvolatile memory via the first channel, and instruct the second set of write processes to the second nonvolatile memory via the second channel.

10. The memory system according to claim 9, wherein
the memory controller is configured to perform the first set of write processes to the first nonvolatile memory and the second set of write processes to the second nonvolatile memory in units of a logical page,
the differences in progress include a difference between a first number and a second number, the first number corresponding to the number of performed write processes in the first set of write processes, the second number corresponding to the number of performed write processes in the second set of write processes, and
each of the first number and the second number is a number of the logical page.

11. A controlling method of a memory system, the memory system comprising a first nonvolatile memory and a second nonvolatile memory each including a plurality of memory cells, the method comprising:
performing, in parallel, a first set of write processes sequentially performed on the first nonvolatile memory, and a second set of write processes sequentially performed on the second nonvolatile memory;
changing a setting of at least one unperformed write process among the first set of write processes and the second set of write processes based on differences in progress between the first set of write processes and the second set of write processes, the first set of write processes and the second set of write processes being performed in parallel.

12. The controlling method according to claim 11, wherein
the differences in progress include a difference between a first number and a second number, the first number corresponding to the number of performed write processes in the first set of write processes, the second number corresponding to the number of performed write processes in the second set of write processes.

13. The controlling method according to claim 12, wherein
the setting changing includes reducing, when the first number is greater than the second number by at least a threshold, a first upper limit value to be smaller than a second upper limit value, the first upper limit value being a value for a time allocated for at least one unperformed write process among the second set of write processes, the second upper limit value being a value for a time allocated for a performed write process among the second set of write processes.

14. The controlling method according to claim 12, wherein
the setting changing includes changing, when the first number is greater than the second number by at least a threshold, data to be written into the second nonvolatile memory in at least one unperformed write process among the second set of write processes from original data to be written to NULL data.

15. The controlling method according to claim 12, wherein
the setting changing includes increasing, when the first number is greater than the second number by at least a threshold, a third upper limit value to be greater than fourth upper limit value, the third upper limit value being a correctable number of error bits allocated for at least one unperformed write process among the second set of write processes, the fourth upper limit value being a correctable number of error bits allocated for a performed write process among the second set of write processes.

16. The controlling method according to claim 12, wherein
the changing of setting includes increasing, when the first number is greater than the second number by at least a threshold, a first upper limit value to be greater than a second upper limit value, the first upper limit value being a value for time allocated for at least one unperformed write process among the first set of write processes, the second upper limit value being a value for a time allocated for a performed write process among the first set of write processes.

17. The controlling method according to claim 12, wherein
the changing of setting includes reducing, when the first number is greater than the second number by at least a threshold, a third number to be smaller than a fourth number, the third number being a number of bits of data to be written into each of the memory cells of the second nonvolatile memory in at least one unperformed write process among the second set of write processes, the fourth number being a number of bits of data to be written into each of the memory cells in the second nonvolatile memory in a performed write process among the second set of write processes.

18. The controlling method according to claim 12, wherein
the performing includes performing the first set of write processes to the first nonvolatile memory and the second set of write processes to the second nonvolatile memory in units of a logical page, and
each of the first number and the second number is a number of the logical pages.

19. The controlling method according to claim 11, wherein the performing includes:
instructing the first set of write processes to the first nonvolatile memory via a first channel coupling between the memory system and the first nonvolatile memory; and
instructing the second set of write processes to the second nonvolatile memory via a second channel coupling between the memory system and the second nonvolatile memory.

20. The controlling method according to claim 19, wherein
the performing includes performing the first set of write processes to the first nonvolatile memory and the second set of write processes to the second nonvolatile memory in units of a logical page,
the differences in progress include a difference between a first number and a second number, the first number corresponding to the number of performed write processes in the first set of write processes, the second number corresponding to the number of performed write processes in the second set of write processes, and each of the first number and the second number is a number of the logical pages.

\* \* \* \* \*